United States Patent
Thangaraj et al.

(10) Patent No.: US 9,558,125 B2
(45) Date of Patent: Jan. 31, 2017

(54) PROCESSING OF UN-MAP COMMANDS TO ENHANCE PERFORMANCE AND ENDURANCE OF A STORAGE DEVICE

(71) Applicant: SanDisk Enterprise IP LLC, Milpitas, CA (US)

(72) Inventors: Senthil M. Thangaraj, Fremont, CA (US); Divya Reddy, Milpitas, CA (US); Venkatesh K. Paulsamy, Mountain View, CA (US); Satish Babu Vasudeva, Fremont, CA (US); Jimmy Sy, Daly City, CA (US); Rakesh Chandra, San Jose, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 118 days.

(21) Appl. No.: 14/668,690

(22) Filed: Mar. 25, 2015

(65) Prior Publication Data

US 2016/0117252 A1    Apr. 28, 2016

Related U.S. Application Data

(60) Provisional application No. 62/069,249, filed on Oct. 27, 2014.

(51) Int. Cl.
*G06F 12/08* (2016.01)
*G06F 12/02* (2006.01)
*G06F 11/14* (2006.01)

(52) U.S. Cl.
CPC ....... *G06F 12/0873* (2013.01); *G06F 11/1441* (2013.01); *G06F 12/0246* (2013.01);
(Continued)

(58) Field of Classification Search
None
See application file for complete search history.

(56) References Cited

U.S. PATENT DOCUMENTS 4,586,167 A    4/1986    Fujishima et al.
5,559,988 A    9/1996    Durante et al.
(Continued)

FOREIGN PATENT DOCUMENTS

EP        0 376 285 A2    7/1990
WO    WO 2012/083308    6/2012

OTHER PUBLICATIONS

Jeremic, Nikolaus, et al. "Dataset Management-Aware Software Architecture for Storage Systems Based on SSDs." Networking, Architecture and Storage (NAS), 2012 IEEE 7th International Conference on. IEEE, 2012.*
(Continued)

*Primary Examiner* — Charles Rones
*Assistant Examiner* — Hewy Li
(74) *Attorney, Agent, or Firm* — Morgan, Lewis & Bockius LLP

(57) ABSTRACT

A storage device and method enable processing of un-map commands. In one aspect, the method includes (1) determining whether a size of an un-map command satisfies (e.g., is greater than or equal to) a size threshold, (2) if the size of the un-map command satisfies the size threshold, performing one or more operations of a first un-map process, wherein the first un-map process forgoes (does not include) saving a mapping table to non-volatile memory of a storage device, and (3) if the size of the un-map command does not satisfy the size threshold, performing one or more operations of a second un-map process, wherein the second un-map process forgoes (does not include) saving the mapping table to non-volatile memory of the storage device and forgoes (does not include) flushing a write cache to non-volatile memory of the storage device.

20 Claims, 9 Drawing Sheets

(52) U.S. Cl.
CPC ...... *G06F 12/0804* (2013.01); *G06F 12/0871* (2013.01); *G06F 11/1471* (2013.01); *G06F 2212/1016* (2013.01); *G06F 2212/1021* (2013.01); *G06F 2212/1036* (2013.01); *G06F 2212/214* (2013.01); *G06F 2212/312* (2013.01); *G06F 2212/608* (2013.01); *G06F 2212/7201* (2013.01); *G06F 2212/7205* (2013.01); *G06F 2212/7207* (2013.01); *G06F 2212/7208* (2013.01)

(56) References Cited

U.S. PATENT DOCUMENTS

| | | |
|---|---|---|
| 5,909,559 A | 6/1999 | So |
| 6,247,136 B1 | 6/2001 | MacWilliams et al. |
| 6,292,410 B1 | 9/2001 | Yi et al. |
| 6,401,213 B1 | 6/2002 | Jeddeloh |
| 6,449,709 B1 | 9/2002 | Gates |
| 8,122,202 B2 | 2/2012 | Gillingham |
| 8,825,967 B2 | 9/2014 | Hong Beom |
| 2003/0115403 A1 | 6/2003 | Bouchard et al. |
| 2003/0122834 A1 | 7/2003 | Mastronarde et al. |
| 2004/0117441 A1 | 6/2004 | Liu et al. |
| 2007/0233937 A1 | 10/2007 | Coulson et al. |
| 2008/0140914 A1 | 6/2008 | Jeon |
| 2009/0168525 A1 | 7/2009 | Olbrich et al. |
| 2009/0222627 A1 | 9/2009 | Reid |
| 2009/0282191 A1 | 11/2009 | Depta |
| 2010/0005217 A1 | 1/2010 | Jeddeloh |
| 2010/0014364 A1 | 1/2010 | Laberge et al. |
| 2010/0174853 A1 | 7/2010 | Lee et al. |
| 2010/0250874 A1 | 9/2010 | Farrell et al. |
| 2011/0264851 A1 | 10/2011 | Jeon et al. |
| 2011/0302474 A1 | 12/2011 | Goss et al. |
| 2012/0047317 A1 | 2/2012 | Yoon et al. |
| 2012/0159070 A1 | 6/2012 | Baderdinni et al. |
| 2013/0007380 A1 | 1/2013 | Seekins et al. |
| 2013/0070507 A1 | 3/2013 | Yoon |
| 2013/0132650 A1 | 5/2013 | Choi et al. |
| 2013/0219106 A1* | 8/2013 | Vogan ................ G06F 12/0246 711/103 |
| 2013/0254498 A1 | 9/2013 | Adachi et al. |
| 2013/0297894 A1* | 11/2013 | Cohen ................. G06F 3/0679 711/154 |
| 2014/0047170 A1* | 2/2014 | Cohen ................ G06F 12/0246 711/103 |
| 2014/0229655 A1 | 8/2014 | Goss et al. |
| 2014/0229656 A1 | 8/2014 | Goss et al. |
| 2014/0241071 A1 | 8/2014 | Goss et al. |
| 2014/0244897 A1 | 8/2014 | Goss et al. |
| 2014/0258598 A1 | 9/2014 | Canepa et al. |
| 2014/0310241 A1 | 10/2014 | Goyen |
| 2015/0186278 A1 | 7/2015 | Jayakumar et al. |
| 2015/0301749 A1 | 10/2015 | Seo et al. |
| 2016/0170831 A1 | 6/2016 | Lesartre et al. |

OTHER PUBLICATIONS

Seagate. "SCSI Commands Reference Manual." Published Apr. 2010. <http://www.seagate.com/staticfiles/support/disc/manuals/Interface%20manuals/100293068c.pdf>.*

International Search Report and Written Opinion dated Nov. 18, 2015, received in International Patent Application No. PCT/US2015/039552 which corresponds to U.S. Appl. No. 14/559,183, 11 pages (Ellis).

International Search Report and Written Opinion dated Nov. 9, 2015, received in International Patent Application No. PCT/US2015/053551, which corresponds to U.S. Appl. No. 14/668,690, 12 pages (Thangaraj).

International Search Report and Written Opinion dated Nov. 11, 2015, received in International Patent Application No. PCT/US2015/053582, which corresponds to U.S. Appl. No. 14/659,493, 12 pages (Prins).

Seagate Technology, "SCSI Commands Reference Manual, Rev. C", Product Manual dated Apr. 2010, pp. 211-214.

International Search Report and Written Opinion dated Jul. 4, 2016, received in International Patent Application No. PCT/US2016/028477, which corresponds to U.S. Appl. No. 14/883,540, 11 pages (Hodgdon).

* cited by examiner

PROCESSING OF UN-MAP COMMANDS TO ENHANCE PERFORMANCE AND ENDURANCE OF A STORAGE DEVICE

RELATED APPLICATIONS

This application claims priority to U.S. Provisional Application No. 62/069,249, filed Oct. 27, 2014, which is hereby incorporated by reference in its entirety.

This application is related to U.S. Provisional Application No. 62/069,251, filed Oct. 27, 2014, entitled "Tracking Intermix of Writes and Un-map Commands across Power Cycles," which is hereby incorporated by reference in its entirety.

TECHNICAL FIELD

The disclosed embodiments relate generally to memory systems, and in particular, to processing of un-map commands to enhance performance and endurance of a storage device (e.g., comprising one or more flash memory devices).

BACKGROUND

Semiconductor memory devices, including flash memory, typically utilize memory cells to store data as an electrical value, such as an electrical charge or voltage. A flash memory cell, for example, includes a single transistor with a floating gate that is used to store a charge representative of a data value. Flash memory is a non-volatile data storage device that can be electrically erased and reprogrammed. More generally, non-volatile memory (e.g., flash memory, as well as other types of non-volatile memory implemented using any of a variety of technologies) retains stored information even when not powered, as opposed to volatile memory, which requires power to maintain the stored information.

Since flash memory can only be programmed and erased a limited number of times and further, some memory commands need to be completed in a predefined amount of time (e.g., to meet qualification requirements), it is important to optimize memory management processes (e.g., command processing) to enhance performance and endurance of memory devices.

SUMMARY

Various embodiments of systems, methods, and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various embodiments are used to enable processing of un-map commands to enhance performance and endurance of a storage device. In one aspect, one or more operations of a first un-map process are performed in accordance with a determination that a size of an un-map command satisfies a size threshold and one or more operations of a second un-map process are performed in accordance with a determination that the un-map command does not satisfy the size threshold, where neither the first un-map process nor the second un-map process includes saving a mapping table to non-volatile memory of a storage device.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

Figure 1:
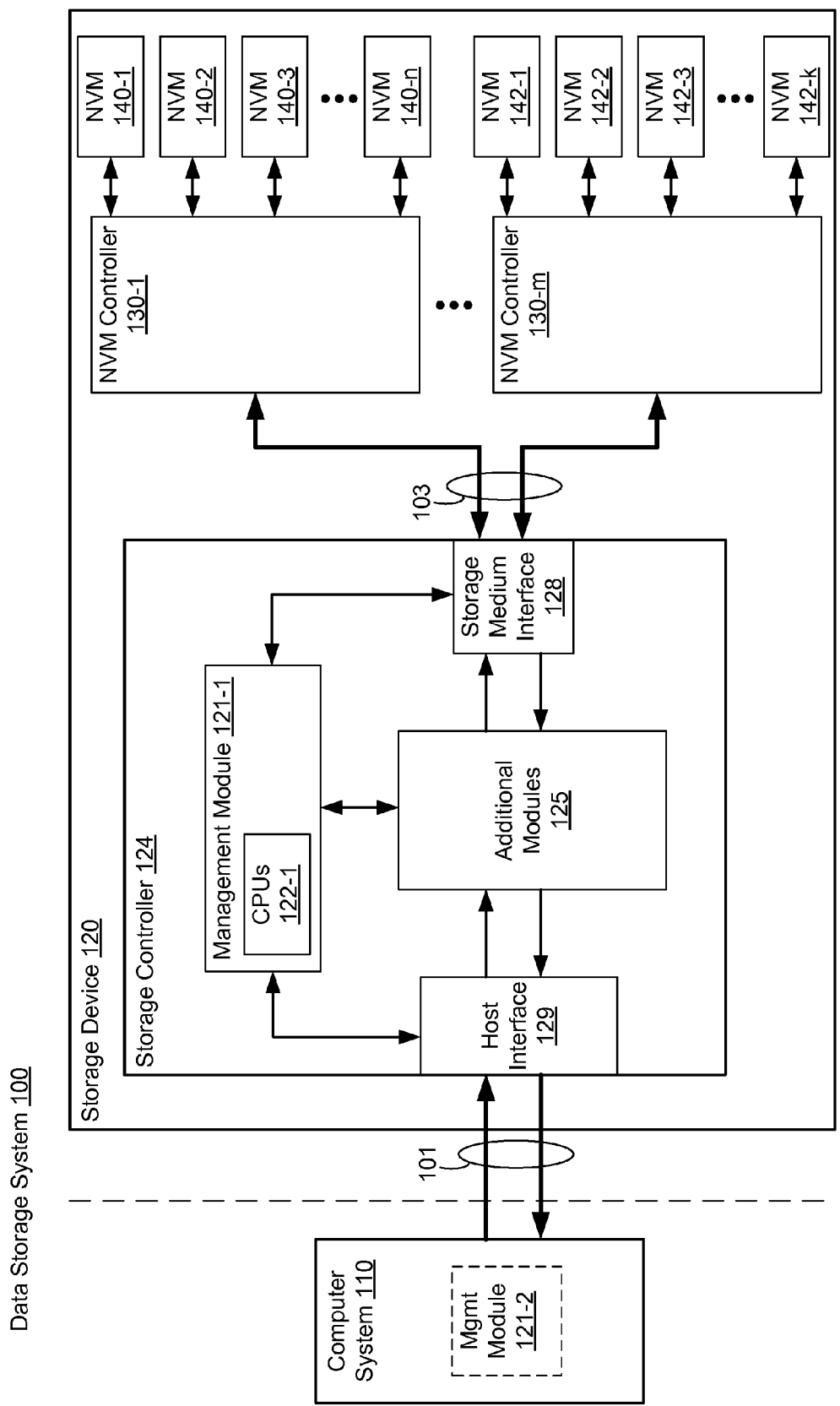
FIG. 1 is a block diagram illustrating an implementation of a data storage system, in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various embodiments described herein include systems, methods, and/or devices used to enable processing of un-map commands to enhance performance and endurance of a storage device. Some embodiments include systems, methods and/or devices to perform one or more operations of a first un-map process in accordance with a determination that a size of an un-map command satisfies (e.g., is greater than or equal to) a size threshold and to perform one or more operations of a second un-map process in accordance with a determination that the un-map command does not satisfy (e.g., is less than) the size threshold, where neither the first un-map process nor the second un-map process includes saving a mapping table to non-volatile memory of a storage device.

(A1) More specifically, some embodiments include a method of managing a storage system. In some embodiments, the method includes (1) maintaining a write cache, in volatile memory, for storing data corresponding to write commands from a host, wherein the host is operatively coupled to a storage device of the storage system, the storage device including non-volatile memory, (2) maintaining a mapping table in volatile memory, the mapping table used to translate logical addresses in a logical address space available to the host to physical addresses in a physical address space of the storage device, (3) receiving, at the storage device of the storage system, an un-map command from the host, (4) determining whether a size of the un-map command satisfies a size threshold, wherein the size of the un-map command corresponds to a number of logical addresses to be un-mapped by the un-map command, (5) in accordance with a determination that the size of the un-map command satisfies the size threshold, performing one or more operations of a first un-map process, wherein the first un-map process forgoes (i.e., does not include) saving the mapping table to the non-volatile memory of the storage device, and (6) in accordance with a determination that the size of the un-map command does not satisfy the size threshold, performing one or more operations of a second un-map process, wherein the second un-map process forgoes (i.e., does not include) saving the mapping table to the non-volatile memory of the storage device and forgoes (i.e., does not include) flushing the write cache to the non-volatile memory of the storage device.

(A2) In some embodiments of the method of A1, the one or more operations of the first un-map process include: (1) determining a number of entries in the write cache that contain dirty data and determining whether the number of entries in the write cache that contain dirty data satisfies a threshold, (2) in accordance with a determination that the number of entries in the write cache that contain dirty data satisfies the threshold, flushing the write cache to the non-volatile memory of the storage device, (3) in accordance with a determination that the number of entries in the write cache that contain dirty data does not satisfy the threshold, clearing each entry of the write cache that contains dirty data for a logical address unmapped by the un-map command, (4) updating the mapping table in volatile memory in accordance with the un-map command, and (5) adding one or more entries to a log, the one or more entries corresponding to the un-map command.

(A3) In some embodiments of the method of any of A1 to A2, the one or more operations of the second un-map process include, for each logical address specified by the un-map command, in accordance with a determination that the logical address is represented in an entry from the write cache, clearing the entry from the write cache.

(A4) In some embodiments of the method of any of A1 to A2, the one or more operations of the second un-map process include: (1) determining whether data for a respective logical address specified by the un-map command is stored in the write cache, (2) in accordance with a determination that the data for the respective logical address is stored in the write cache: (a) determining whether the data for the respective logical address is in flight, (b) in accordance with a determination that the data for the respective logical address is in flight, waiting for a corresponding write operation to complete, and (c) clearing from the write cache an entry storing the data for the respective logical address, (3) updating the mapping table in volatile memory in accordance with the un-map command, and (4) adding one or more entries to a log, the one or more entries corresponding to the un-map command.

(A5) In some embodiments of the method of any of A1 to A4, the second un-map process allows other commands from the host to be processed along with the un-map command.

(A6) In some embodiments of the method of any of A1 to A5, response time of the un-map command corresponds to the size of the un-map command.

(A7) In some embodiments of the method of any of A1 to A6, the method further includes saving the mapping table, on a scheduled basis that is independent of un-map commands received from the host, to the non-volatile memory of the storage device.

(A8) In some embodiments of the method of any of A1 to A7, the log includes an entry, for a respective un-map command, that includes information identifying a plurality of logical addresses un-mapped in accordance with the respective un-map command.

(A9) In some embodiments of the method of any of A1 to A8, the log includes an entry, for a respective un-map command, that includes information identifying a range of logical addresses un-mapped in accordance with the respective un-map command.

(A10) In some embodiments of the method of any of A1 to A9, the storage device comprises one or more flash memory devices.

(A11) In another aspect, a storage device includes non-volatile memory (e.g., comprising one or more non-volatile storage devices, such as flash memory devices), a write cache, and a storage controller having one or more processors configured to execute instructions in one or more programs, wherein the storage controller is configured to perform any of the methods A1 to A10 described herein.

(A12) In some embodiments of the storage device of A11, the storage controller includes a write cache module for maintaining the write cache; a mapping module for maintaining the mapping table; and an un-map module that determines whether the size of the un-map command satisfies the size threshold, performs the first un-map process in accordance with the determination that the size of the un-map command satisfies the size threshold, and performs the second un-map process in accordance with the determination that the size of the un-map command does not satisfy the size threshold.

(A13) In yet another aspect, any of the methods A1 to A10 described above are performed by a storage device including means for performing any of the methods described herein.

(A14) In yet another aspect, a storage system includes (1) a storage medium (e.g., comprising one or more non-volatile storage devices, such as flash memory devices) (2) one or more processors, and (3) memory (e.g., non-volatile memory or volatile memory in the storage system) storing one or more programs, which when executed by the one or more processors cause the storage system to perform or control performance of any of the methods A1 to A10 described herein.

(A15) In yet another aspect, some embodiments include a non-transitory computer readable storage medium, storing one or more programs configured for execution by one or more processors of a storage device, the one or more programs including instructions for performing any of the methods described herein.

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure pertinent aspects of the embodiments described herein.

FIG. 1 is a block diagram illustrating a storage device 120 in a data storage system 100, in accordance with some embodiments. While some example features are illustrated, various other features have not been illustrated for the sake of brevity and so as not to obscure pertinent aspects of the example embodiments disclosed herein. To that end, as a non-limiting example, storage device 120 (also sometimes called an information storage device, or a data storage device, or a memory device) includes storage controller 124, one or more non-volatile memory (NVM) controllers 130 such as flash controllers, and non-volatile memory (e.g., one or more NVM device(s) 140, 142 such as one or more flash memory devices), and is used in conjunction with computer system 110. In some embodiments, storage device 120 includes a single NVM device while in other embodiments storage device 120 includes a plurality of NVM devices. In some embodiments, NVM devices 140, 142 include NAND-type flash memory or NOR-type flash memory. Further, in some embodiments, NVM controllers 130 are solid-state drive (SSD) controllers. However, other types of storage media may be included in accordance with aspects of a wide variety of embodiments (e.g., PCRAM, ReRAM, STT-RAM, etc.). In some embodiments, a flash memory device includes one or more flash memory die, one or more flash memory packages, one or more flash memory channels or the like. In some embodiments, data storage system 100 can contain more than one storage device 120.

Computer system 110 is coupled to storage controller 124 through data connections 101. However, in some embodiments computer system 110 includes storage controller 124, or a portion of storage controller 124, as a component and/or a subsystem. For example, in some embodiments, some or all of the functionality of storage controller 124 is implemented by software executed on computer system 110. Computer system 110 may be any suitable computer device, such as a computer, a laptop computer, a tablet device, a netbook, an internet kiosk, a personal digital assistant, a mobile phone, a smart phone, a gaming device, a computer server, or any other computing device. Computer system 110 is sometimes called a host, host system, client, or client system. In some embodiments, computer system 110 is a server system, such as a server system in a data center. In some embodiments, computer system 110 includes one or more processors, one or more types of memory, a display and/or other user interface components such as a keyboard, a touch screen display, a mouse, a track-pad, a digital camera, and/or any number of supplemental devices to add functionality. In some embodiments, computer system 110 does not have a display and other user interface components.

The one or more NVM controllers 130 are coupled with storage controller 124 through connections 103. Connections 103 are sometimes called data connections, but typically convey commands in addition to data, and optionally convey metadata, error correction information and/or other information in addition to data values to be stored in NVM devices 140, 142 and data values read from NVM devices 140, 142. In some embodiments, however, storage controller 124, the one or more NVM controllers 130, and NVM devices 140, 142 are included in the same device (i.e., an integrated device) as components thereof. Furthermore, in some embodiments, storage controller 124, the one or more NVM controllers 130, and NVM devices 140, 142 are embedded in a host device (e.g., computer system 110), such as a mobile device, tablet, other computer or computer controlled device, and the methods described herein are performed, at least in part, by the embedded storage controller.

In some embodiments, storage device 120 includes NVM devices 140, 142 such as flash memory devices (e.g., NVM devices 140-1 through 140-n, and NVM devices 142-1 through 142-k) and NVM controllers 130 (e.g., NVM controllers 130-1 through 130-m). Viewed another way, storage device 120 includes m memory channels, each of which has an NVM controller 130 and a set of NVM devices 140 or 142 coupled to the NVM controller 130, where m is an integer greater than one. However, in some embodiments, two or more memory channels share an NVM controller 130. In either example, each memory channel has its own distinct set of NVM devices 140 or 142. In a non-limiting example, the number of memory channels in a typical storage device is 8, 16 or 32. In another non-limiting example, the number of NVM devices 140 or 142 per memory channel is typically 8, 16, 32 or 64. Furthermore, in some embodiments, the number of NVM devices 140/142 is different in different memory channels.

In some embodiments, each NVM controller of NVM controllers 130 includes one or more processing units (also sometimes called CPUs or processors or microprocessors or microcontrollers) configured to execute instructions in one or more programs (e.g., in NVM controllers 130). In some embodiments, the one or more processors are shared by one or more components within, and in some cases, beyond the function of NVM controllers 130. NVM devices 140, 142 are coupled to NVM controllers 130 through connections that typically convey commands in addition to data, and optionally convey metadata, error correction information and/or other information in addition to data values to be stored in NVM devices 140, 142 and data values read from NVM devices 140, 142. NVM devices 140, 142 may include any number (i.e., one or more) of memory devices including, without limitation, non-volatile semiconductor memory devices, such as flash memory device(s).

For example, flash memory device(s) (e.g., NVM devices 140, 142) can be configured for enterprise storage suitable for applications such as cloud computing, for database applications, primary and/or secondary storage, or for caching data stored (or to be stored) in secondary storage, such as hard disk drives. Additionally and/or alternatively, flash memory device(s) (e.g., NVM devices 140, 142) can also be configured for relatively smaller-scale applications such as personal flash drives or hard-disk replacements for personal, laptop, and tablet computers. Although flash memory devices and flash controllers are used as an example here, in some embodiments storage device 120 includes other non-volatile memory device(s) and corresponding non-volatile storage controller(s).

In some embodiments, NVM devices 140, 142 are divided into a number of addressable and individually selectable blocks. In some embodiments, the individually selectable blocks are the minimum size erasable units in a flash memory device. In other words, each block contains the minimum number of memory cells that can be erased simultaneously. Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector, which is a subunit of a page. That is, a block includes a plurality of pages, each page contains a plurality of sectors, and each sector is the minimum unit of data for reading data from the flash memory device.

As noted above, while data storage densities of non-volatile semiconductor memory devices are generally increasing, a drawback of increasing storage density is that the stored data is more prone to being stored and/or read erroneously. In some embodiments, error control coding can be utilized to limit the number of uncorrectable errors that are introduced by electrical fluctuations, defects in the storage medium, operating conditions, device history, write-read circuitry, etc., or a combination of these and various other factors.

In some embodiments, storage controller 124 includes a management module 121-1, a host interface 129, a storage medium (I/O) interface 128, and additional module(s) 125. Storage controller 124 may include various additional features that have not been illustrated for the sake of brevity and so as not to obscure pertinent features of the example embodiments disclosed herein, and a different arrangement of features may be possible.

Host interface 129 provides an interface to computer system 110 through data connections 101. Similarly, storage medium interface 128 provides an interface to NVM controllers 130 though connections 103. In some embodiments, storage medium interface 128 includes read and write circuitry, including circuitry capable of providing reading signals to NVM controllers 130 (e.g., reading threshold voltages for NAND-type flash memory). In some embodiments, connections 101 and connections 103 are implemented as a communication media over which commands and data are communicated, using a protocol such as DDR3, SCSI, SATA, SAS, or the like. In some embodiments, storage controller 124 includes one or more processing units (also sometimes called CPUs or processors or microprocessors or microcontrollers) configured to execute instructions in one or more programs (e.g., in storage controller 124). In some embodiments, the one or more processors are shared by one or more components within, and in some cases, beyond the function of storage controller 124.

In some embodiments, management module 121-1 includes one or more processing units (CPUs, also sometimes called processors or microprocessors or microcontrollers) 122 configured to execute instructions in one or more programs (e.g., in management module 121-1). In some embodiments, the one or more CPUs 122 are shared by one or more components within, and in some cases, beyond the function of storage controller 124. Management module 121-1 is coupled to host interface 129, additional module(s) 125 and storage medium interface 128 in order to coordinate the operation of these components. In some embodiments, one or more modules of management module 121-1 are implemented in management module 121-2 of computer system 110. In some embodiments, one or more processors of computer system 110 (not shown) are configured to execute instructions in one or more programs (e.g., in management module 121-2). Management module 121-2 is coupled to storage device 120 in order to manage the operation of storage device 120.

Additional module(s) 125 are coupled to storage medium interface 128, host interface 129, and management module 121-1. As an example, additional module(s) 125 may include an error control module to limit the number of uncorrectable errors inadvertently introduced into data during writes to memory and/or reads from memory. In some embodiments, additional module(s) 125 are executed in software by the one or more CPUs 122 of management module 121-1, and, in other embodiments, additional module(s) 125 are implemented in whole or in part using special purpose circuitry (e.g., to perform encoding and decoding functions). In some embodiments, additional module(s) 125 are implemented in whole or in part by software executed on computer system 110.

In some embodiments, an error control module, included in additional module(s) 125, includes an encoder and a decoder. In some embodiments, the encoder encodes data by applying an error control code (ECC) to produce a codeword, which is subsequently stored in NVM devices 140, 142. When encoded data (e.g., one or more codewords) is read from NVM devices 140, 142, the decoder applies a decoding process to the encoded data to recover the data, and to correct errors in the recovered data within the error correcting capability of the error control code. Those skilled in the art will appreciate that various error control codes have different error detection and correction capacities, and that particular codes are selected for various applications for reasons beyond the scope of this disclosure. As such, an exhaustive review of the various types of error control codes is not provided herein. Moreover, those skilled in the art will appreciate that each type or family of error control codes may have encoding and decoding algorithms that are particular to the type or family of error control codes. On the other hand, some algorithms may be utilized at least to some extent in the decoding of a number of different types or families of error control codes. As such, for the sake of brevity, an exhaustive description of the various types of encoding and decoding algorithms generally available and known to those skilled in the art is not provided herein.

In some embodiments, during a write operation, host interface 129 receives data to be stored in NVM devices 140, 142 from computer system 110. The data received by host interface 129 is made available to an encoder (e.g., in additional module(s) 125), which encodes the data to produce one or more codewords. The one or more codewords are made available to storage medium interface 128, which transfers the one or more codewords to NVM devices 140, 142 (e.g., through NVM controllers 130) in a manner dependent on the type of storage medium being utilized.

In some embodiments, a read operation is initiated when computer system (host) 110 sends one or more host read commands (e.g., via data connections 101, or alternatively a separate control line or bus) to storage controller 124 requesting data from NVM devices 140, 142. Storage controller 124 sends one or more read access commands to NVM devices 140, 142 (e.g., through NVM controllers 130), via storage medium interface 128, to obtain raw read data in accordance with memory locations (addresses) specified by the one or more host read commands. Storage medium interface 128 provides the raw read data (e.g., comprising one or more codewords) to a decoder (e.g., in additional module(s) 125). If the decoding is successful, the decoded data is provided to host interface 129, where the decoded data is made available to computer system 110. In some embodiments, if the decoding is not successful, storage controller 124 may resort to a number of remedial actions or provide an indication of an irresolvable error condition.

As explained above, a storage medium (e.g., NVM devices 140, 142) is divided into a number of addressable and individually selectable blocks and each block is optionally (but typically) further divided into a plurality of pages and/or word lines and/or sectors. While erasure of a storage medium is performed on a block basis, in many embodiments, reading and programming of the storage medium is performed on a smaller subunit of a block (e.g., on a page basis, word line basis, or sector basis). In some embodiments, the smaller subunit of a block consists of multiple memory cells (e.g., single-level cells or multi-level cells). In some embodiments, programming is performed on an entire page. In some embodiments, a multi-level cell (MLC) NAND flash typically has four possible states per cell, yielding two bits of information per cell. Further, in some embodiments, a MLC NAND has two page types: (1) a lower page (sometimes called fast page), and (2) an upper page (sometimes called slow page). In some embodiments, a triple-level cell (TLC) NAND flash has eight possible states per cell, yielding three bits of information per cell.

Although the description herein uses TLC, MLC, and SLC as examples, those skilled in the art will appreciate that the embodiments described herein may be extended to memory cells that have more than eight possible states per cell, yielding more than three bits of information per cell. In some embodiments, the encoding format of the storage media (i.e., TLC, MLC, or SLC and/or a chosen data redundancy mechanism) is a choice made when data is actually written to the storage media.

As an example, if data is written to a storage medium in pages, but the storage medium is erased in blocks, pages in the storage medium may contain invalid (e.g., stale) data, but those pages cannot be overwritten until the whole block containing those pages is erased. In order to write to the pages with invalid data, the pages (if any) with valid data in that block are read and re-written to a new block and the old block is erased (or put on a queue for erasing). This process is called garbage collection. After garbage collection, the new block contains the pages with valid data and may have free pages that are available for new data to be written, and the old block can be erased so as to be available for new data to be written. Since flash memory can only be programmed and erased a limited number of times, the efficiency of the algorithm used to pick the next block(s) to re-write and erase has a significant impact on the lifetime and reliability of flash-based storage systems.

Write amplification is a phenomenon where the actual amount of physical data written to a storage medium (e.g., NVM devices 140, 142 in storage device 120) is a multiple of the logical amount of data written by a host (e.g., computer system 110, sometimes called a host) to the storage medium. As discussed above, when a block of storage medium must be erased before it can be re-written, the garbage collection process to perform these operations results in re-writing data one or more times. This multiplying effect increases the number of writes required over the life of a storage medium, which shortens the time it can reliably operate. The formula to calculate the write amplification of a storage system is given by equation:

$$\frac{\text{amount of data written to a strong medium}}{\text{amount of data written by a host}}$$

One of the goals of any flash memory based data storage system architecture is to reduce write amplification as much as possible so that available endurance is used to meet storage medium reliability and warranty specifications. Higher system endurance also results in lower cost as the storage system may need less over-provisioning. By reducing write amplification, the endurance of the storage medium is increased and the overall cost of the storage system is decreased. Generally, garbage collection is performed on erase blocks with the fewest number of valid pages for best performance and best write amplification.

Flash memory devices utilize memory cells to store data as electrical values, such as electrical charges or voltages. Each flash memory cell typically includes a single transistor with a floating gate that is used to store a charge, which modifies the threshold voltage of the transistor (i.e., the voltage needed to turn the transistor on). The magnitude of the charge, and the corresponding threshold voltage the charge creates, is used to represent one or more data values. In some embodiments, during a read operation, a reading threshold voltage is applied to the control gate of the transistor and the resulting sensed current or voltage is mapped to a data value.

The terms "cell voltage" and "memory cell voltage," in the context of flash memory cells, mean the threshold voltage of the memory cell, which is the minimum voltage that needs to be applied to the gate of the memory cell's transistor in order for the transistor to conduct current. Similarly, reading threshold voltages (sometimes also called reading signals and reading voltages) applied to flash memory cells are gate voltages applied to the gates of the flash memory cells to determine whether the memory cells conduct current at that gate voltage. In some embodiments, when a flash memory cell's transistor conducts current at a given reading threshold voltage, indicating that the cell voltage is less than the reading threshold voltage, the raw data value for that read operation is a "1" and otherwise the raw data value is a "0."

Figure 2:
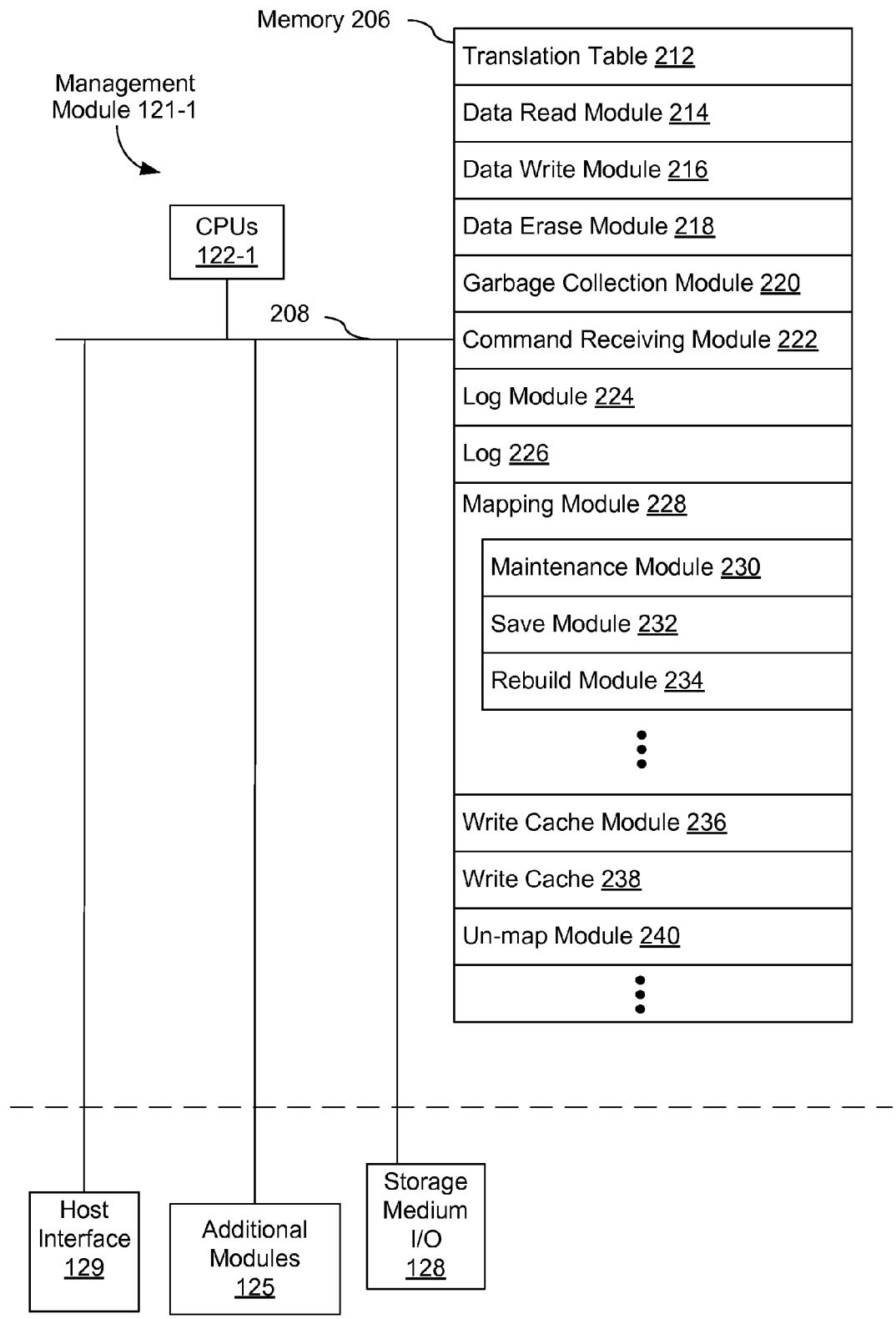
FIG. 2 is a block diagram illustrating an implementation of a management module, in accordance with some embodiments.
Figure 4:
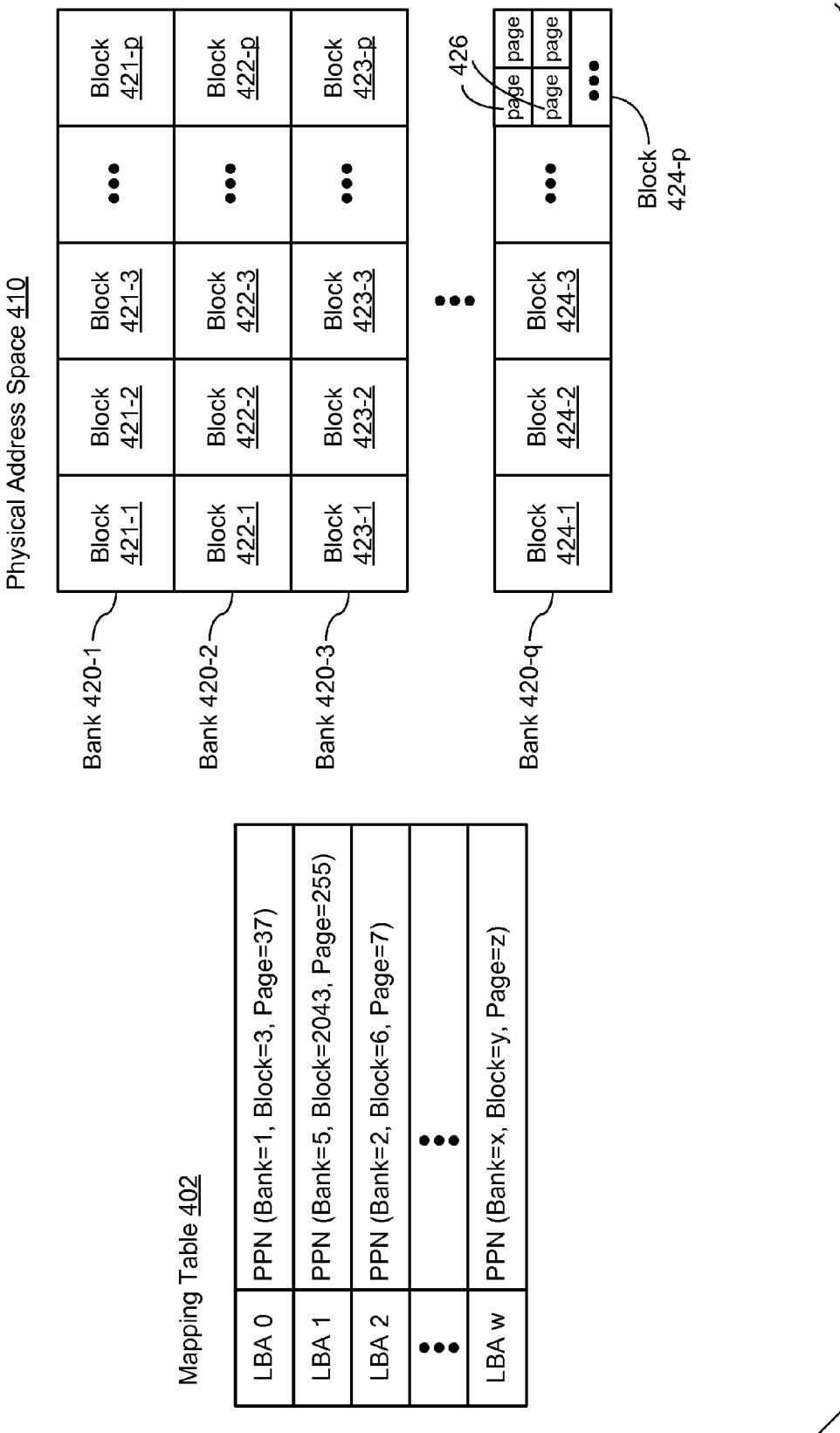
FIG. 4 is a block diagram of a mapping table and physical address space, in accordance with some embodiments.

FIG. 2 is a block diagram illustrating a management module 121-1, in accordance with some embodiments, as shown in FIG. 1. Management module 121-1 typically includes one or more processing units (sometimes called CPUs or processors) 122-1 for executing modules, programs and/or instructions stored in memory 206 and thereby performing processing operations, memory 206 (sometimes called controller memory), and one or more communication buses 208 for interconnecting these components. The one or more communication buses 208 optionally include circuitry (sometimes called a chipset) that interconnects and controls communications between system components. Management module 121-1 is coupled to host interface 129, additional module(s) 125, and storage medium I/O 128 by the one or more communication buses 208. Memory 206 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from the CPU(s) 122-1. Memory 206, or alternatively the non-volatile memory device(s) within memory 206, comprises a non-transitory computer readable storage medium. In some embodiments, memory 206, or the non-transitory computer readable storage medium of memory 206 stores the following programs, modules, and data structures, or a subset or superset thereof:

- translation table 212 that is used for mapping logical addresses to physical addresses (e.g., in some embodiments, translation table 212 includes mapping table 402, FIG. 4);
- data read module 214 that is used for reading data from one or more codewords, pages or blocks in a storage medium (e.g., NVM devices 140, 142, FIG. 1);
- data write module 216 that is used for writing data to one or more codewords, pages or blocks in a storage medium (e.g., NVM devices 140, 142, FIG. 1);
- data erase module 218 that is used for erasing data from one or more blocks in a storage medium (e.g., NVM devices 140, 142, FIG. 1);
- garbage collection module 220 that is used for garbage collection for one or more blocks in a storage medium (e.g., NVM devices 140, 142, FIG. 1);
- command receiving module 222 that is used for receiving a plurality of commands (e.g., un-map commands and I/O commands such as write requests and/or read requests) from a host;

log module 224 that is used for maintaining and/or saving a log (e.g., log 226, sometimes called a Replay FIFO);

log 226 that includes a collection of data structures corresponding to write commands and un-map commands from a host, and contains sufficient information to enable the translation table 212 to be rebuilt, starting from a partially out of date copy of translation table 212, in the event of a power failure;

mapping module 228 that is used for performing one or more operations related to a mapping table (e.g., translation table 212), optionally including:

maintenance module 230 that is used for maintaining the mapping table in volatile memory;

save module 232 that is used for saving the mapping table to non-volatile memory of the storage device; and rebuild module 234 that is used for rebuilding the mapping table;

write cache module 236 that is used for maintaining a write cache (e.g., managing the writing and flushing of data to and from write cache 238);

write cache 238 that includes a collection of data structures (e.g., write cache entries) for storing data corresponding to write commands from a host; and un-map module 240 that is used for determining a size of an un-map command and performing one or more operations of an un-map process.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the non-transitory computer readable storage medium of memory 206, provide instructions for implementing some of the methods described below. In some embodiments, some or all of these modules may be implemented with specialized hardware circuits that subsume part or all of the module functionality.

Although FIG. 2 shows management module 121-1 in accordance with some embodiments, FIG. 2 is intended more as a functional description of the various features which may be present in management module 121-1 than as a structural schematic of the embodiments described herein. In practice, and as recognized by those of ordinary skill in the art, the programs, modules, and data structures shown separately could be combined and some programs, modules, and data structures could be separated.

Figure 3:
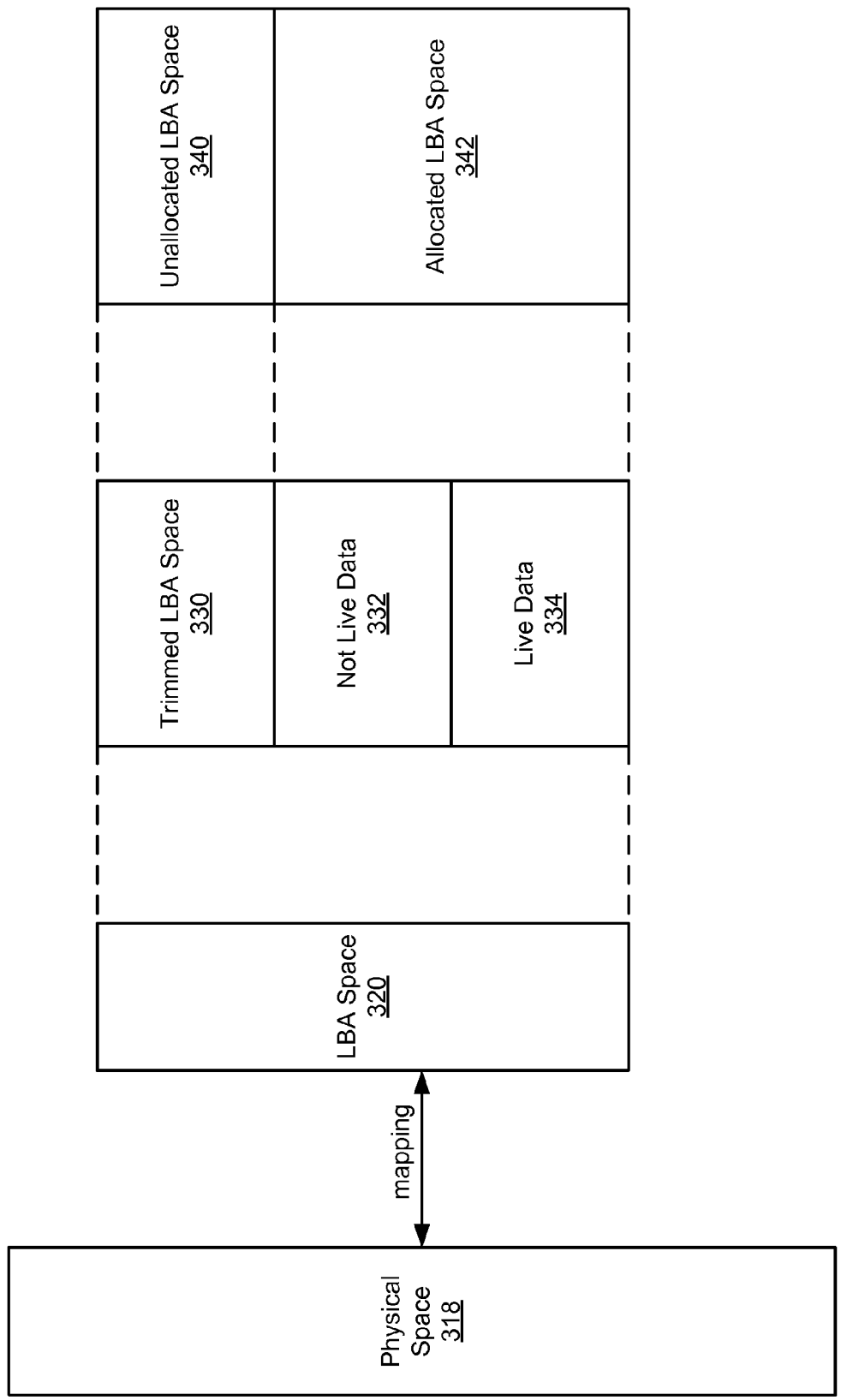
FIG. 3 is a block diagram of a logical address space, and more specifically a logical block address (LBA) space, in accordance with some embodiments.

FIG. 3 is a block diagram of a logical block address (LBA) space 320 (sometimes called logical address (LA) space), in accordance with some embodiments. In some embodiments, a logical address is the address at which an item (e.g., a file or other data) resides from the perspective of a host (e.g., computer system 110, FIG. 1). In some embodiments, a logical address (e.g., in LBA space 320) differs from a physical address (e.g., in physical space 318) due to the operation of a mapping function or address translator (e.g., a function or module that includes translation table 212, FIG. 2, or mapping table 402, FIG. 4). In some embodiments, logical addresses are implemented as logical block addresses (LBAs), which are mapped to physical flash addresses (e.g., physical page numbers (PPNs). Physical addresses typically include portions, such as bank, block and page, corresponding to multiple levels of a memory hierarchy.

In some embodiments, a logical block address (LBA) is mapped to a physical flash address (e.g., a physical page number (PPN), including a bank, block, and page), as described further with respect to FIG. 4.

In some embodiments, a logical address space includes allocated logical address space (e.g., allocated LBA space 342) and unallocated logical address space (e.g., unallocated LBA space 340). In some embodiments, unallocated logical address space is logical address space at which no data is stored. In some embodiments, unallocated logical address space includes logical address space that has never been written to and/or has been discarded (previously written data may be discarded through a trim or un-map operation, and is sometimes called trimmed logical address space). For example, in FIG. 3, unallocated LBA space 340 includes trimmed LBA space 330. In some embodiments, allocated logical address space is logical address space that was previously-written by a host, the previously-written data including data that is no longer used by a host (e.g., not live data 332) and data that is still in use by the host (e.g., live data 334). In some embodiments, not live data is data in a portion of the logical address space that is marked as free, available or unused in the metadata of a file system. Optionally, a file system may choose to convert not live address space into unallocated address space through a trim or un-map operation.

In FIG. 3, allocated LBA space 342 represents an amount of allocated space, and unallocated LBA space 340 represents an amount of unallocated space. However, neither allocated LBA space 342 nor unallocated LBA space 340 is necessarily a single contiguous region of LBA space 320. Similarly, live data 334 and not live data 332 in FIG. 3 represent amounts (e.g., counts of LBAs) of live data and not live data, respectively. However, neither live data 334 nor not live data 332 is necessarily a single contiguous region of LBA space 320 or allocated LBA space 342, nor do the positions of live data 334 and not live data 332 illustrated in FIG. 3 have any correlation to the logical or physical address values of the live data and not live data. Typically, live data 334 and/or not live data 332 will be present in multiple regions of LBA space 320, and are thus non-contiguous. Optionally, however, a remapping or coalescing process, which can also be called defragmentation, can be performed to consolidate some or all live data 334 into a contiguous region of LBA space 320.

Allocated logical address space (342) is space that is utilized. Typically, reducing the size of the allocated logical address space requires reducing the amount of live data 334 and/or not live data 332 stored by a storage device, or storage system, thereby converting a portion of the allocated logical address space into unallocated logical address space. In some embodiments, portions of not live data 332 are trimmed, and thereby converted into unallocated logical address space through the use of trim or un-map operations.

FIG. 4 is a block diagram of a mapping table 402 and physical address space 410, in accordance with some embodiments. In some embodiments, mapping table 402 contains multiple entries, wherein an entry of mapping table 402 is used to translate a logical address (e.g., a logical block address (LBA)) in a logical address space of a host (e.g., computer system 110, FIG. 1) to a physical address in a physical address space (e.g., physical address space 410) of non-volatile memory in a storage device (e.g., storage device 120, FIG. 1). In some embodiments, an LBA is the address of the smallest unit of stored data that is addressable by a host (e.g., 512 B or 4096 B). In some embodiments, LBAs are a sequence of integers organized in numerical order in the logical address space. In some embodiments, LBAs are integers chosen from a logical address space but need not be contiguous. For example, in implementations that utilize a sparse logical address space, the amount of addressable space is governed by a limit on the number of logical addresses that can be allocated, but those logical addresses are distributed over a larger address space than the maximum number of logical addresses that can be allocated (e.g., to a host or a set of hosts or clients).

In some embodiments, mapping table 402 is stored in memory associated with the storage device (e.g., in memory 206, as part of translation table 212, FIG. 2). In some embodiments, mapping table 402 is used to implement translation table 212 in management module 121-1 (FIG. 2). In some embodiments, a physical address is a physical page number (PPN), including a bank number, a block number, and a page number. In the example shown in FIG. 4, LBA 0 is mapped to bank 1 (e.g., Bank 420-1), block 3 (e.g., Block 421-3), page 37 (pages not shown in Block 421-3) of physical address space 410. FIG. 4 shows that physical address space 410 includes a plurality of non-volatile memory blocks 421, 422 423, 424. As described above, and as shown in the representation of block 424-p, each non-volatile memory block in the physical address space of a storage device typically includes a plurality of pages 426, where each page is typically an instance of the smallest individually accessible (e.g., readable or writable) portion of a block. Although FIG. 4 illustrates one example of a logical address to physical address mapping, in other embodiments, different mappings may be used. For example, in some embodiments, each of the logical address entries corresponds to multiple (e.g., eight) logical addresses (e.g., 8 LBAs per logical address entry). In some embodiments, mapping table 402 need not contain contiguous LBA addresses and may be organized in any manner that facilitates efficient lookup operations, e.g., hash table, binary tree, content addressable memory, and others.

As noted above, the saving of data and mission critical metadata held in volatile storage is important for a non-volatile data storage device. Flash memory devices need to have data protected across power cycles, and a full translation table (e.g., translation table 212, FIG. 2, or mapping table 402, FIG. 4) is required for a storage device (e.g., storage device 120, FIG. 1) to be valid. However, for enterprise products, the translation table is typically extremely large (e.g., several hundred MB) and saving the full translation table is not viable in the time frame provided by battery backups (e.g., capacitors). In some embodiments, incremental portions of the translation table are saved at scheduled times, in order to minimize the amount of data that needs to be saved in the event of a power failure. However, un-map commands, which effectively erase a portion of data (e.g., one sector, one unit, the whole storage device, etc.), are expected to be executed nearly instantly, for example with a response time no greater than 1 millisecond. This response time does not allow for the saving of the full translation table. Further, saving the full translation table in response to every un-map command is time-consuming, increases write amplification, decreases endurance, and decreases performance. The various embodiments described herein include systems, methods and/or devices used to enable replying quickly to an un-map command, ensuring coherency of the translation table by using a log (sometimes called a Replay FIFO), and enhancing performance and endurance. The benefits provided by the various embodiments described herein are better understood with reference to the below descriptions of FIG. 6 and FIG. 7.

Figure 6:
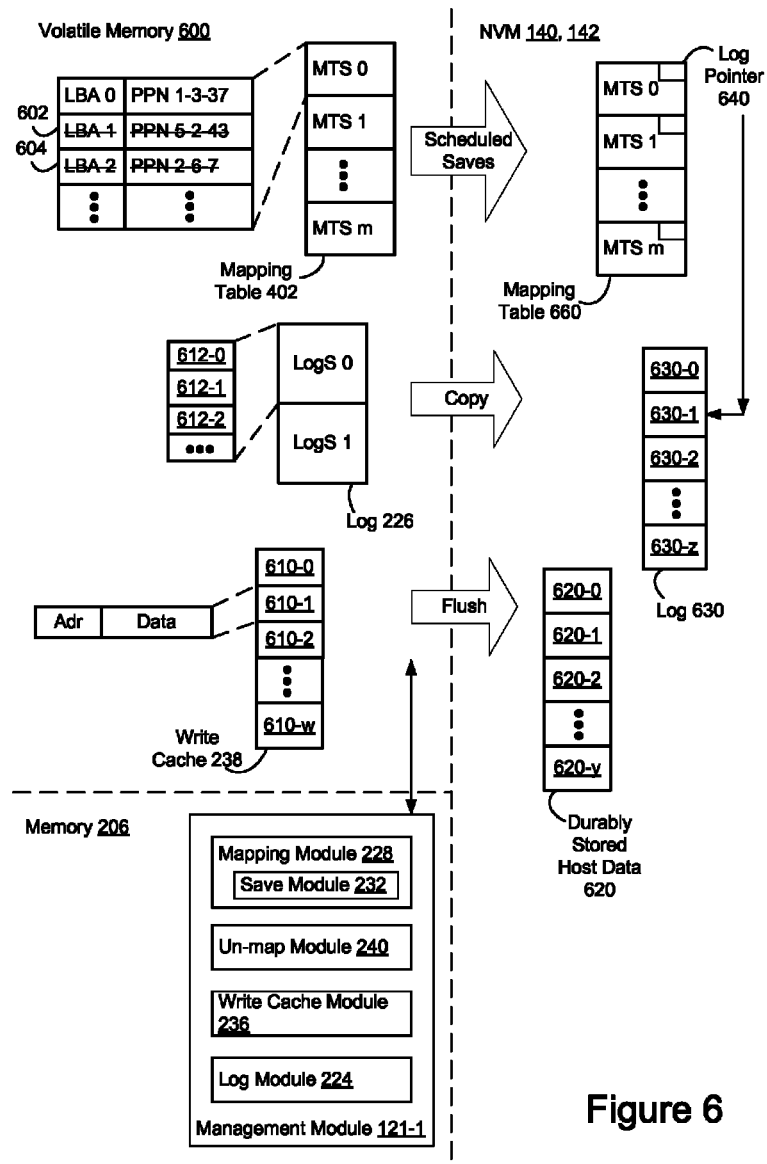
FIG. 6 is a block diagram illustrating saving data in a storage device, and, more specifically, saving to non-volatile memory information stored in volatile memory in a mapping table, a log, and a write cache, in accordance with some embodiments.

FIG. 6 is a block diagram illustrating saving of data in a storage device, and, more specifically, saving to non-volatile memory (e.g., NVM 140, 142) information stored in volatile memory 600 in a mapping table, a log, and a write cache (e.g., mapping table 402, log 226, and write cache 238), in accordance with some embodiments. Volatile memory 600, in some embodiments, contains one or more mapping tables (e.g., mapping table 402), one or more logs (e.g., log 226), and one or more write caches (e.g., write cache 238). In some embodiments, volatile memory 600 is memory 206 (FIG. 2) or a portion of memory 206.

In order to decrease command processing and execution time for commands received from a host, such as un-map commands, the storage device, in some embodiments, stores information in various data structures in volatile memory. To preserve that information between power cycles, the storage devices saves at least portions of that information to non-volatile memory. For example, storage device 120 stores information in mapping table 402, log 226, and write cache 238 in volatile memory 600 to NVM 140, 142 in a manner that improves command processing and execution times. In some embodiments, a management module coordinates the saving of information from those data structures to non-volatile memory. For example, management module 121-1 is used in some embodiments to coordinate flushing of write cache 238, copying of log 226, and scheduled saves for mapping table 402 to NVM 140, 142. More specifically, in some embodiments, write cache module 236 is used to facilitate write cache flushing, log module 240 is used to facilitate copying of one or more segments of log 226, and save module 232 of mapping module 228 is used to coordinate scheduled saves of one or more segments of mapping table 402.

In some embodiments, the mapping table stored in volatile memory comprises two or more distinct segments, sometimes called regions or portions. As pictured in FIG. 6, mapping table 402 contains a sequence of mapping table segments MTS 0, through MTS m. In some embodiments, each MTS within the mapping table contains a number of entries. For example, MTS 0 of mapping table 402 contains an entry indicating that LBA 0 is mapped to a PPN located at bank 1, block 3, and page 37 (abbreviated as "1-3-37") within NVM 140, 142). The contents of the mapping table are discussed in more detail above, with reference to FIG. 4.

As discussed in more detail below with reference to FIGS. 5A-5C, segments (e.g., MTS 0) of the mapping table (e.g., mapping table 402) are saved to non-volatile memory on a scheduled basis that is independent of un-map commands received from the host (e.g., independent of receiving and/or processing the un-map commands). In some embodiments, each segment of mapping table 660 contains a log pointer indicating a position within log 630. For example, as pictured in FIG. 6, the non-volatile copy of MTS 0 contains log pointer 640 pointing to entry 630-1 within log 630. Typically, when a segment of the mapping table is copied to non-volatile memory, the corresponding log pointer points to either the last entry in log 226 (or the corresponding position in log 630), or the first unfilled entry of log 226 (or the corresponding position in log 630). Stated another way, in some embodiments, the log pointer 640 in each mapping table segment is offset from a last entry written to the log prior to saving the mapping table segment to the non-volatile memory of the storage device. Furthermore, the oldest log pointer 640 corresponds to the oldest log entry to be processed when rebuilding mapping table 402 in volatile memory 600. In some embodiments, the rebuilding of mapping table 402 is initiated after a power fail event.

In some embodiments, the log stored in volatile memory contains one or more distinct segments, sometimes called regions or portions. In some embodiments, each segment of the log contains one or more entries corresponding to write commands and un-map commands from the host. For example, as pictured in FIG. 6, log 226 contains log segment 0 ("LogS 0") and LogS 1 and each log segment contains a number of entries corresponding to write commands and un-map commands from the host (e.g., entries 612-0, 612-1, and 612-2 of LogS 0). More specifically, in this example, entry 612-0 corresponds to an un-map command requesting unmapping of LBA 1 (illustrated with strikethrough text in mapping table entry 602) and entry 612-0 contains information indicating that LBA 1 has been un-mapped.

In some embodiments, copying the log from volatile memory to non-volatile memory includes saving at least a first portion of the log to non-volatile memory (e.g., NVM devices 140, 142) when the log satisfies predefined fullness criteria, and saving a final portion of the log to non-volatile memory in conjunction with a power fail event. For example, in some embodiments, when the log is half full, a first half of the log is saved to non-volatile memory, and in conjunction with a power fail event, a final portion (e.g., a remainder of the log not yet saved) of the log is saved to non-volatile memory. As pictured in FIG. 6, for example, when LogS 0 satisfies the predefined fullness criteria, the storage device copies LogS 0 to non-volatile memory. After copying LogS 0 to non-volatile memory, in some embodiments, the storage device continues to add log entries to log 226 by adding entries to LogS 1. In accordance with a determination that a power fail event has occurred, a final segment of the log is saved to non-volatile memory (e.g., LogS 1 of log 226). In some embodiments, log information (write operation and un-map information) is written to the log in round robin order: after LogS 0 is filled, it is copied to non-volatile memory, and new log information is written to LogS 1 until it is filled, at which point LogS 1 is copied to non-volatile memory, and new log information is written to LogS 0. Furthermore, in some embodiments, the non-volatile copy of each log segment 630-*i* is retained until the oldest log pointer 640 for the segments of mapping table 660 points to a log position beyond the end of that log segment.

In some embodiments, a write cache stored in volatile memory (e.g., write cache 238) contains a number of individual entries (e.g., cache lines) wherein the individual entries or cache lines (excluding empty cache lines) each include address information (e.g., a logical address, physical address, or both) and write data corresponding to write commands from the host. In some embodiments, the write data is data not yet saved to the non-volatile memory of the storage device. For example, as pictured in FIG. 6, write cache 238 contains individual entries 610-0, 610-1, 610-2, . . . 610-*w*. To decrease the processing time required for un-map commands, flushing of the write cache to non-volatile memory occurs on an optimized basis (see below discussion of FIG. 7 for additional details). While flushing the write cache, the data in individual entries or cache lines is stored with other durably (i.e., persistently) stored host data in non-volatile memory. For example, as pictured in FIG. 6, after flushing write cache 238 to non-volatile memory, the data corresponding to individual entries 610-1 and 610-2 is stored with durably stored host data 620, shown here as data 620-1 and 620-2. Write cache flushing in the context of un-map command processing, in some embodiments, is better understood with reference to FIG. 7.

Figure 7:
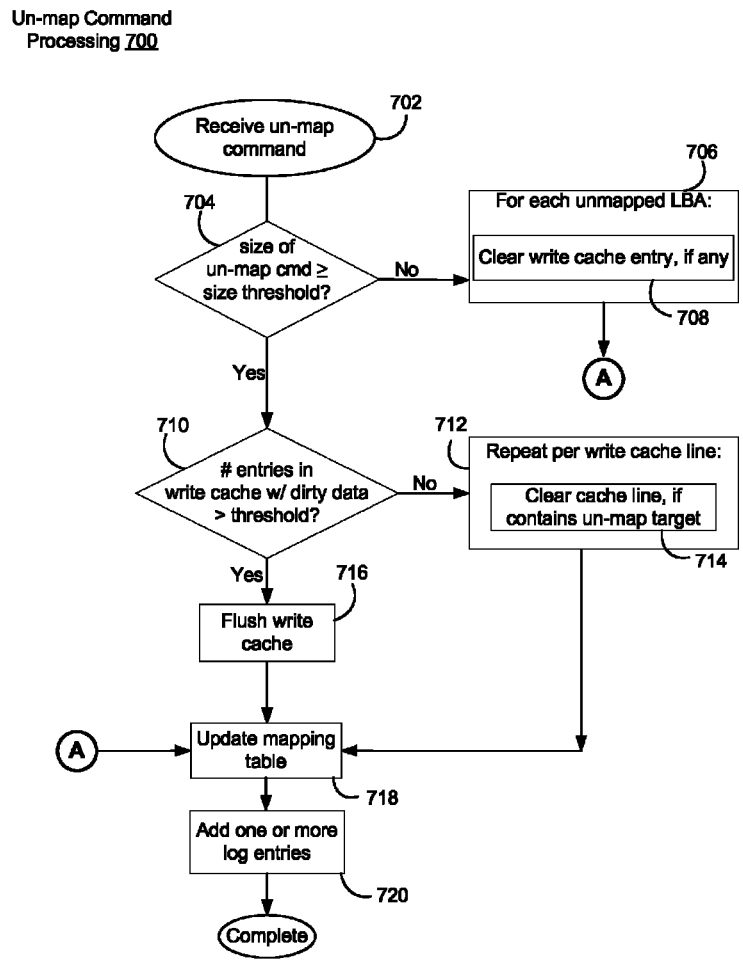
FIG. 7 illustrates a flowchart representation of a method for processing un-map commands in a storage device, in accordance with some embodiments.

FIG. 7 illustrates a flowchart representation of a method for processing un-map commands within a storage system, in accordance with some embodiments. At least in some embodiments, un-map command processing method 700 is performed by a storage device (e.g., storage device 120, FIG. 1) or one or more components of the storage device (e.g., storage controller 124, NVM controllers 130 and/or NVM devices 140, 142, FIG. 1), wherein the storage device is operatively coupled with a host system (e.g., computer system 110, FIG. 1). In some embodiments, un-map command processing method 700 is governed by instructions that are stored in a non-transitory computer readable storage medium and that are executed by one or more processors of a device, such as the one or more processing units (CPUs) 122-1 of management module 121-1, shown in FIGS. 1 and 2. In some embodiments, un-map command processing method 700 is performed by a storage device (e.g., data storage device 120, FIG. 1) or one or more components of a storage system (e.g., computer system 110 and/or storage device 120, FIG. 1). In some embodiments, some of the operations of un-map command processing method 700 are performed at a host (e.g., computer system 110, FIG. 1) and information is transmitted to a storage device (e.g., storage device 120, FIG. 1). In some embodiments, un-map command processing method 700 is governed, at least in part, by instructions that are stored in a non-transitory computer readable storage medium and that are executed by one or more processors of a host (not shown in FIG. 1). For ease of explanation, the following describes un-map command processing method 700 as performed by a storage device (e.g., by storage controller 124 of storage device 120, FIG. 1). In some embodiments, the operations of method 700 are performed, at least in part, by command receiving module 222, un-map module 240, write-cache module 236, and log module 224 of management module 121-1 (FIG. 2). However, those skilled in the art will appreciate that in other embodiments, one or more of the operations described in un-map command processing method 700 are performed by a host (e.g., computer system 110, FIG. 1).

Un-map command processing method 700 begins, in some embodiments, when the storage device receives (702) an un-map command. The size of the un-map command is determined. For example, in some embodiments, the size of the un-map command equals or corresponds to the number of logical block addresses unmapped by the un-map command. In some embodiments, the size of the un-map command equals or corresponds to the size of the logical address space portion unmapped by the un-map command. In accordance with a first determination (704—No) that a size of the un-map command does not satisfy (e.g., is less than) a size threshold ("small un-map command"), the storage device proceeds to determine whether data for each respective logical address (706) specified by the un-map command is stored in a write cache. If data for a respective logical address (e.g., an LBA) is stored in the write cache, then the storage device clears (708) from the write cache (e.g., a write cache in volatile memory of the storage device) those write cache entries storing data for the respective logical address. Typically, data for a respective logical block address, if stored in the write cache, is stored in a single write cache entry, and thus only the one write cache entry is cleared.

Alternatively, if data for the respective logical address (e.g., an LBA) is stored in a write cache entry, then the storage device, in some embodiments, marks the data in the write cache entry as not dirty instead of clearing the write cache entry. In some such embodiments, write cache entries are cleared or overwritten in accordance with a cache entry eviction scheme. In some embodiments, the storage device proceeds to update a mapping table (718) in accordance with the un-map command and to add one or more entries to a log (720).

For example, with reference to FIG. 6, if a small un-map command requests unmapping of LBA 2 (604) and write cache 238 contains write cache entry 610-0 with data for LBA 2, then the storage device clears write cache entry 610-0 (alternatively, the storage device, in some embodiments, marks the data in write cache entry 610-0 as not dirty). The storage device, in some embodiments, also updates mapping table 402 by unmapping (illustrated by strikethrough text in mapping table entry 604) LBA 2 from a PPN located at 2-6-7 within NVM 140, 142 and adds an entry to log 226 indicating that LBA 2 has been unmapped. As a result, after operation 708 has been performed, data previously stored in write cache 238 for LBA 2 is not saved to non-volatile memory the next time write cache 238 is flushed to non-volatile memory (e.g., NVM 140, 142).

In some embodiments, in accordance with the first determination (704—Yes) instead indicating that the size of the un-map command satisfies (e.g., is greater than or equal to) the size threshold ("large un-map command"), then a second determination (710) is made by the storage device. In accordance with the second determination (710) indicating that a number of entries in the write cache with dirty data is less than a threshold number (sometimes herein called a second threshold, or write cache usage threshold, to distinguish if from the aforementioned size threshold) of entries with dirty data (710—No), the storage device proceeds to analyze each write cache line (712) within the write cache. For each respective write cache line (712), the storage device determines whether the respective write cache line contains an un-map target (i.e., the respective write cache line contains data for a logical address specified by the un-map command). In accordance with a third determination that the respective write cache line contains a un-map target, the storage device clears (714) the cache line from the write cache (alternatively, the storage device, in some embodiments, marks the data in the cache line as not dirty). In addition, the storage device updates the mapping table (718) in accordance with the un-map command and adds one or more entries to the log (720).

For example, with reference to FIG. 6, if a large un-map command requests unmapping LBAs 1-2 (mapping table entries 602 and 604) and write cache 238 contains write cache entry 610-0 with data for LBA 2 and no other entries in the write cache contain un-map targets, then the storage device clears write cache entry 610-0 (or, alternatively, marks the data in write cache entry 610-0 as not dirty) and does not clear any other entries from write cache 238. The storage device also updates mapping table 402 by unmapping LBA 1 (e.g., mapping table entry 602) from a PPN located at 5-2-43 within NVM 140, 142 and unmapping LBA 2 (e.g., mapping table entry 604) from the PPN located at 2-6-7 within NVM 140, 142. In some embodiments, the storage device also adds an entry to log 226 indicating that LBAs 1-2 have been unmapped. As a result, after operation 714 has been performed, data previously stored in write cache 238 for LBAs 1 and 2 is not saved to non-volatile memory the next time write cache 238 is flushed to non-volatile memory (e.g., NVM 140, 142).

In accordance with the first determination (704—Yes), indicating that the un-map command is large, and the second determination (710) instead indicating that the number of entries in the write cache with dirty data is greater than a threshold number of entries with dirty data (710—Yes), the storage device flushes the write cache (716) to non-volatile memory, thereby writing all dirty data in the write cache to non-volatile memory. As an example, with reference to FIG. 6, if a large un-map command requests unmapping of LBAs 1-2 and write cache 238 contains a number of entries with dirty data that is greater than the threshold number of entries with dirty data, then the storage device flushes the write cache 238 (e.g., the data in all of the write cache entries having dirty data is stored as durably stored host data 620 in NVM 140, 142). The storage device also updates the mapping table (718) in accordance with the un-map command and adds one or more corresponding entries to the log (720).

Processing un-map commands in accordance with the embodiments discussed above results in significant performance gains. Specifically, the processing time for both large un-map commands and small un-map commands is significantly reduced, because the saving of data (e.g., mapping table(s), log(s), and write cache(s)) occurs on an optimized basis and does not occur in an inefficient fashion (e.g., after every un-map command). Importantly, the processing steps discussed with respect to un-map command processing method 700 (for both small and large un-map commands) do not include saving the mapping table to the non-volatile memory of the storage device. As noted above, saving the mapping table to non-volatile memory is time-consuming, increases write amplification, decreases endurance, and decreases performance. Additionally, the processing steps discussed with respect to un-map command processing method 700, in some embodiments, only flush the write cache to non-volatile memory when the un-map command is large and the number of entries in the write cache with dirty data satisfies a threshold (e.g., the number of entries in the write cache with dirty data is greater than a threshold number of entries with dirty data). As a result, in some implementations, un-map command processing time for small un-map commands decreases by at least a factor of ten, and un-map command processing time for large un-map commands decreases by at least a factor of four.

Additional details concerning each of the processing steps for un-map command processing method 700, as well as details concerning additional processing steps for un-map commands, are presented below with reference to FIGS. 5A-5C.

Figure 5A:
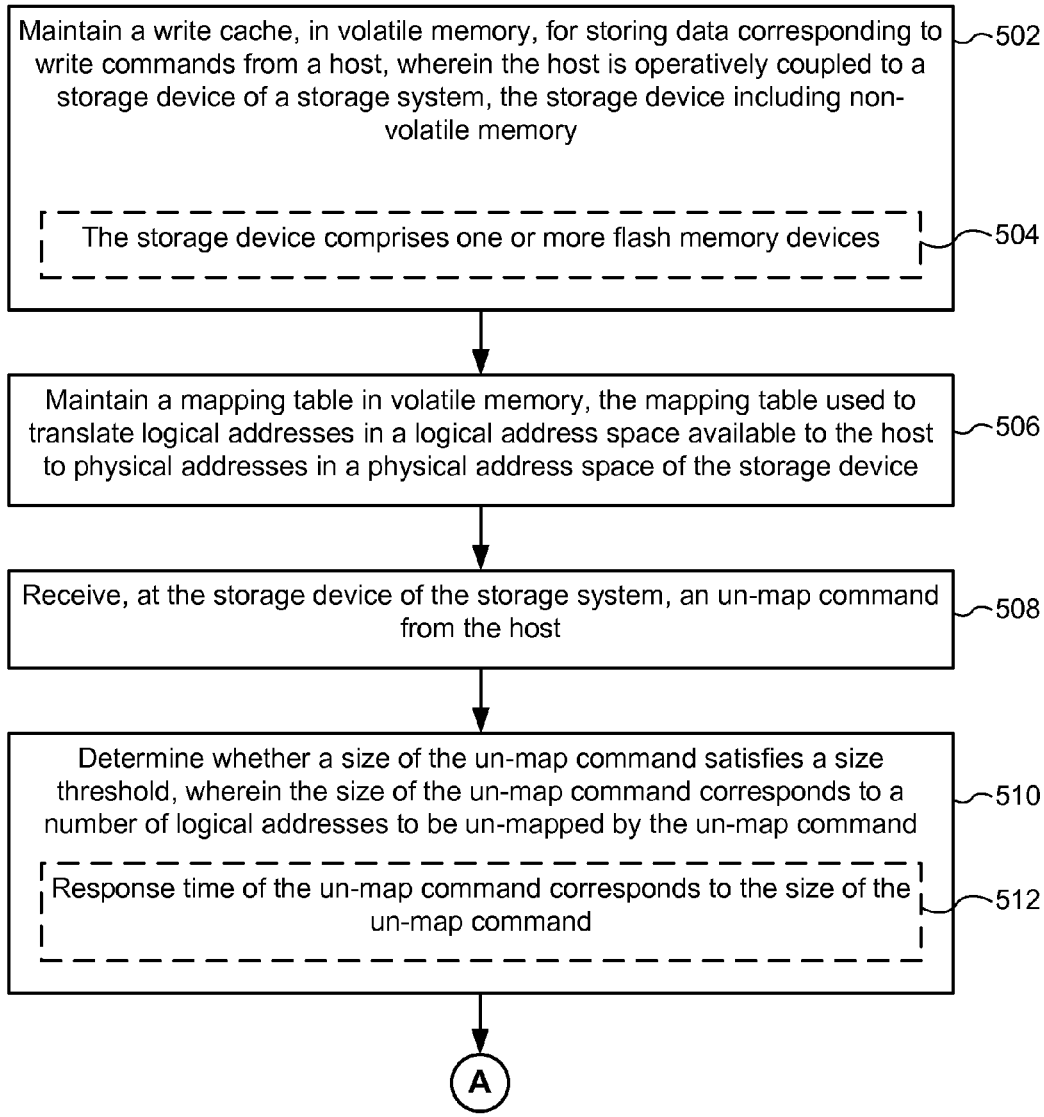
FIGS. 5A-5C illustrate a flowchart representation of a method of managing a storage system, in accordance with some embodiments.
Figure 5B:
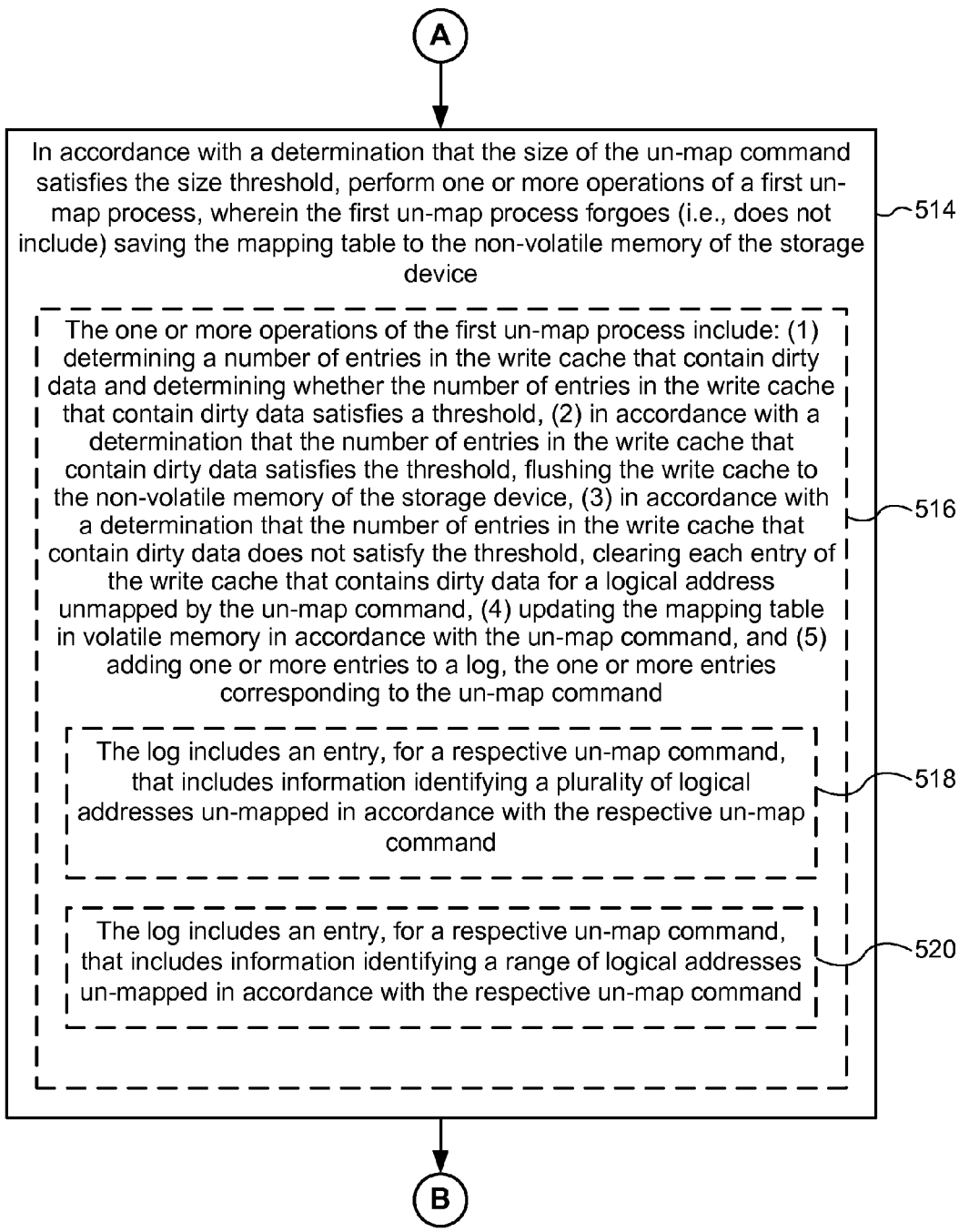
Figure 5C:
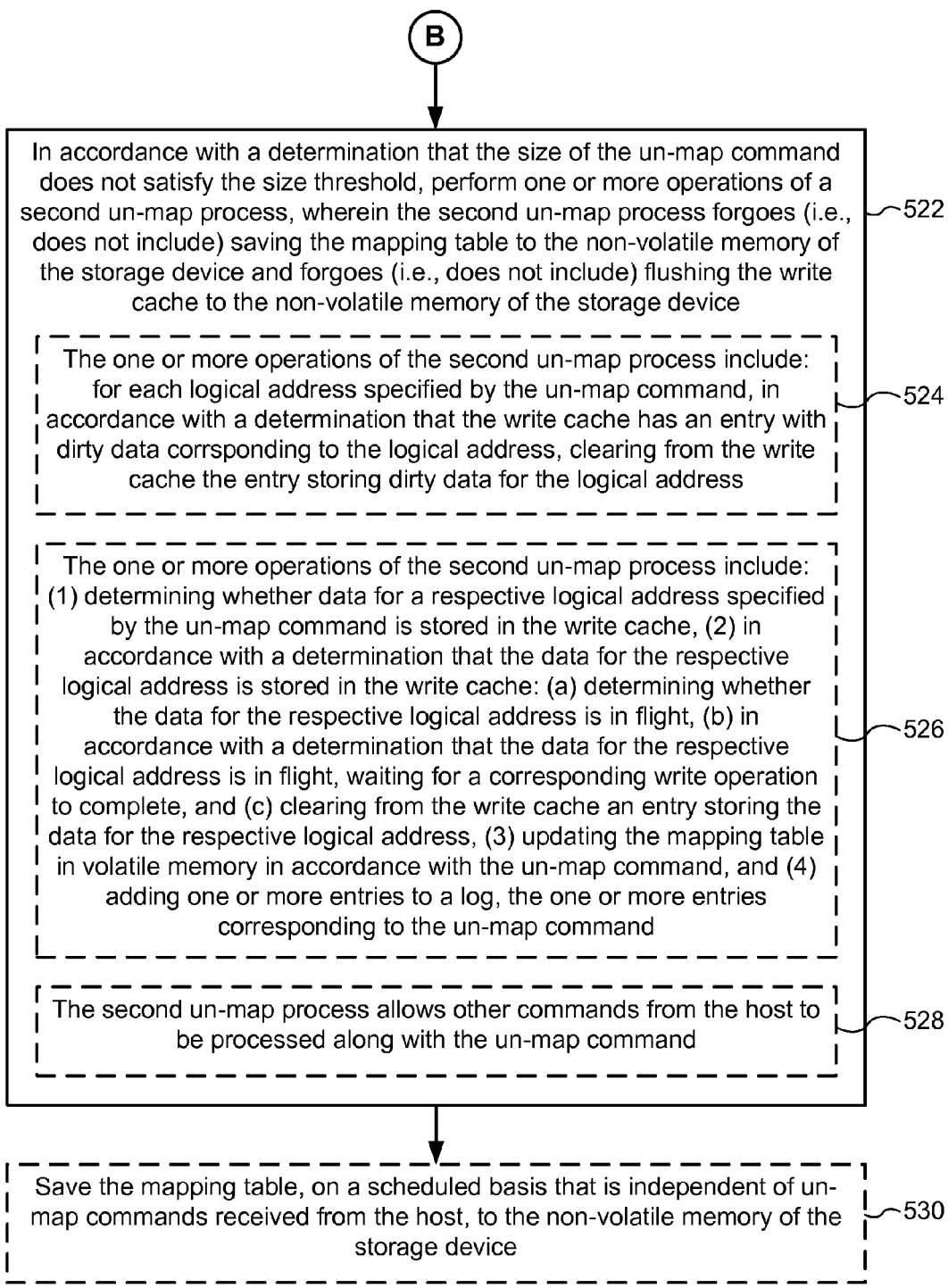

FIGS. 5A-5C illustrate a flowchart representation of a method 500 of managing a storage system, in accordance with some embodiments. At least in some embodiments, method 500 is performed by a storage device (e.g., storage device 120, FIG. 1) or one or more components of the storage device (e.g., storage controller 124, NVM controllers 130 and/or NVM devices 140, 142, FIG. 1), wherein the storage device is operatively coupled with a host system (e.g., computer system 110, FIG. 1). In some embodiments, method 500 is governed by instructions that are stored in a non-transitory computer readable storage medium and that are executed by one or more processors of a device, such as the one or more processing units (CPUs) 122-1 of management module 121-1, shown in FIGS. 1 and 2. In some embodiments, method 500 is performed by a storage device (e.g., storage device 120, FIG. 1) or one or more components of a storage system 100 (e.g., computer system 110 and/or storage device 120, FIG. 1). In some embodiments, some of the operations of method 500 are performed at a host (e.g., computer system 110, FIG. 1) and information is transmitted to a storage device (e.g., storage device 120, FIG. 1). In some embodiments, method 500 is governed, at least in part, by instructions that are stored in a non-transitory computer readable storage medium and that are executed by one or more processors of a host (not shown in FIG. 1). For ease of explanation, the following describes method 500 as performed by a storage device (e.g., storage device 120, FIG. 1). In some embodiments, the operations of method 500 are performed, at least in part, by command receiving module 222, un-map module 240, write-cache module 236, and log module 224 of management module 121-1 (FIG. 2). However, those skilled in the art will appreciate that in other embodiments, one or more of the operations described in method 500 are performed by a host (e.g., computer system 110, FIG. 1).

A storage device (e.g., storage device 120, FIG. 1) maintains (502) a write cache (e.g., write cache 238, FIG. 2) in volatile memory of the storage device, for storing data corresponding to write commands from a host (e.g., computer system 110, FIG. 1). The host is operatively coupled to the storage device, and the storage device includes non-volatile memory (e.g., NVM devices 140, 142, FIG. 1) in addition to the write cache in volatile memory. In some embodiments, a write cache module (e.g., write cache module 236, FIG. 2) is used to manage the write cache. Furthermore, in some embodiments, the write cache stores data not yet saved to the non-volatile memory of the storage device, as described above with respect to FIG. 2.

In some embodiments, the storage device includes (504) one or more flash memory devices. In some embodiments, the storage device includes a storage medium (e.g., NVM devices 140, 142, FIG. 1), and the storage medium includes one or more non-volatile storage devices, such as flash memory devices. In some embodiments, the storage medium is a single flash memory device, while in other embodiments the storage medium includes a plurality of flash memory devices. For example, in some embodiments, the storage medium includes dozens or hundreds of flash memory devices, organized in parallel memory channels, such as 16, 32 or 64 flash memory devices per memory channel, and 8, 16 or 32 parallel memory channels. In some embodiments, the non-volatile storage medium (e.g., NVM devices 140, 142, FIG. 1) includes NAND-type flash memory or NOR-type flash memory. In other embodiments, the storage medium comprises one or more other types of non-volatile storage devices.

The storage device maintains (506) a mapping table (e.g., translation table 212, FIG. 2, and/or mapping table 402, FIG. 4) in volatile memory, the mapping table used to translate logical addresses in a logical address space available to the host to physical addresses in a physical address space of the storage device. In some embodiments, a maintenance module (e.g., maintenance module 230 or mapping module 228, FIG. 2) is used to maintain a mapping table in volatile memory, the mapping table used to translate logical addresses in a logical address space available to the host to physical addresses in a physical address space of the storage device, as described above with respect to FIG. 2.

The storage device receives (508), at the storage device of the storage system, an un-map command from the host. In some embodiments, a command receiving module (e.g., command receiving module 222, FIG. 2) is used to receive, at the storage device of the storage system, an un-map command from the host, as described above with respect to FIG. 2.

The storage device determines (510) whether a size of the un-map command satisfies (e.g., is greater than or equal to) a size threshold, wherein the size of the un-map command corresponds to a number of logical addresses to be un-mapped by the un-map command. In some embodiments, an un-map module (e.g., un-map module 240, FIG. 2) is used to determine whether a size of the un-map command satisfies a size threshold, wherein the size of the un-map command corresponds to a number of logical addresses to be un-mapped by the un-map command, as described above with respect to FIGS. 2 and 7.

In some embodiments, response time of the un-map command corresponds (512) to the size of the un-map command. In some embodiments, the response time of the un-map command is proportional to the size of the un-map command. For example, in some embodiments, the response time of a first un-map command of size x is a first response time and the response time of a second un-map command of size y, where y is greater than x, is a second response time, wherein the second response time is greater than the first response time.

The storage device performs (514), in accordance with a determination that the size of the un-map command satisfies the size threshold, one or more operations of a first un-map process, wherein the first un-map process forgoes (i.e., does not include) saving the mapping table to the non-volatile memory of the storage device. As noted above, saving the mapping table to non-volatile memory is time-consuming, increases write amplification, decreases endurance, and decreases performance. In some embodiments, an un-map module (e.g., un-map module 240, FIG. 2) is used to perform, in accordance with a determination that the size of the un-map command satisfies the size threshold, one or more operations of the first un-map process. An un-map module is described above with respect to FIG. 2.

In some embodiments, the one or more operations of the first un-map process include (516): (1) determining a number of entries in the write cache that contain dirty data and determining whether the number of entries in the write cache that contain dirty data satisfies a threshold (e.g., exceeds the threshold, sometimes herein called a second threshold to distinguish it from the aforementioned size threshold), (2) in accordance with a determination that the number of entries in the write cache that contain dirty data satisfies the threshold, flushing the write cache to the non-volatile memory of the storage device, (3) in accordance with a determination that the number of entries in the write cache that contain dirty data does not satisfy the threshold, clearing each entry of the write cache that contains data for a logical address unmapped by the un-map command (e.g., by checking each entry of the write cache to determine if it stores dirty data for a logical address unmapped by the un-map command, and then clearing that entry if it contains such data), (4) updating the mapping table in volatile memory in accordance with the un-map command, and (5) adding one or more entries to a log (e.g., log 226, FIG. 2, sometimes called a Replay FIFO), the one or more entries corresponding to the un-map command. With respect to operation 516(1), in some embodiments, for example, determining whether more than a threshold number of entries in the write cache contain dirty data includes determining whether the write cache is more than half full with dirty data. With respect to operation 516(3), in some embodiments, the storage device performs a reverse search for a write cache hit (e.g., checking each cache line having dirty data to determine if it contains an entry corresponding to a logical address unmapped by the un-map command). With respect to operation 516(5), in some embodiments, the log corresponds to write commands and un-map commands from the host. In some embodiments, the log is a FIFO (First In First Out) queue. In some embodiments, the storage device maintains a single log for the storage device. In some embodiments, the storage device maintains a distinct log for each logical port (sometimes called a memory channel) of the storage device. In some embodiments, a write cache module (e.g., write cache module 236, FIG. 2), an un-map module (e.g., un-map module 240, FIG. 2), a mapping module (e.g., mapping module 228, FIG. 2) and/or a log module (e.g., log module 224, FIG. 2) perform operation 516 or one or more portions of operation 516.

In some embodiments, the log includes (518) an entry, for a respective un-map command, that includes information identifying a plurality of logical addresses un-mapped in accordance with the respective un-map command. For example, in some embodiments, if a respective un-map command is un-mapping LBA 8, LBA 13, and LBA 63, the entry in the log for the respective un-map command includes information identifying LBA 8, LBA 13, and LBA 63. In some alternative embodiments, the log includes multiple entries corresponding to un-map commands, each entry specifying either an individual LBA or a range of LBAs unmapped by an un-map command. For example, for an un-map command that un-maps LBA 8 and LBAs 100-130, the log contains two entries, one for LBA 8 and the other for LBA range 100-130.

In some embodiments, the log includes (520) an entry, for a respective un-map command, that includes information identifying a range of logical addresses un-mapped in accordance with the respective un-map command. For example, in some embodiments, if a respective un-map command is un-mapping LBA 8 to LBA 63, the entry in the log for the respective un-map command includes information identifying a range of logical addresses from LBA 8 to LBA 63. In some embodiments, the entry in the log identifies the range of logical addresses by identifying the first LBA to un-map and the last LBA to un-map.

The storage device performs (522), in accordance with a determination that the size of the un-map command does not satisfy (e.g., is less than) the size threshold, one or more operations of a second un-map process, wherein the second un-map process forgoes (i.e., does not include) saving the mapping table to the non-volatile memory of the storage device and does not include flushing the write cache to the non-volatile memory of the storage device. As noted above, saving the mapping table to non-volatile memory is time-consuming, increases write amplification, decreases endurance, and decreases performance. Further, flushing the write cache to non-volatile memory decreases endurance of the non-volatile memory and in some circumstances, causes open blocks (that are not yet full) to close, thereby reducing over provisioning and increasing write amplification. In some embodiments, an un-map module (e.g., un-map module 240, FIG. 2) is used to perform, in accordance with a determination that the size of the un-map command does not satisfy the size threshold, one or more operations of a second un-map process, wherein the second un-map process forgoes (i.e., does not include) saving the mapping table to the non-volatile memory of the storage device and forgoes (i.e., does not include) flushing the write cache to the non-volatile memory of the storage device, as described above with respect to FIG. 2.

In some embodiments, the one or more operations of the second un-map process include (524), for each logical address specified by the un-map command, in accordance with a determination that the write cache has an entry with dirty data corresponding to the logical address, clearing that entry from the write cache. Stated another way, in accordance with a determination that the write cache is storing dirty data for the logical address, the second un-map process clears from the write cache the entry storing dirty data for the logical address. In some embodiments, clearing the entry from the write cache includes clearing a dirty flag and freeing a corresponding cache line of the write cache.

In some embodiments, the one or more operations of the second un-map process include (526): (1) determining whether a respective logical address specified by the un-map command is represented in an entry from the write cache, (2) in accordance with a determination that dirty data for the respective logical address is stored in the write cache: (a) determining whether the data for the respective logical address is in flight, (b) in accordance with a determination that the data for the respective logical address is in flight, waiting for a corresponding write operation to complete, and (c) clearing from the write cache an entry storing the data for the respective logical address, (3) updating the mapping table in volatile memory in accordance with the un-map command, and (4) adding one or more entries to a log, the one or more entries corresponding to the un-map command. With respect to operation 526(2)(c), in some embodiments, clearing the entry from the write cache includes clearing a dirty flag and freeing a corresponding cache line of the write cache. With respect to operation 526(4), in some embodiments, the log corresponds to write commands and un-map commands from the host. In some embodiments, the log is a FIFO (First In First Out) queue. In some embodiments, the storage device maintains a single log for the storage device. In some embodiments, the storage device maintains a distinct log for each logical port of the storage device. In some embodiments, a write cache module (e.g., write cache module 236, FIG. 2), an un-map module (e.g., un-map module 240, FIG. 2), a mapping module (e.g., mapping module 228, FIG. 2) and/or a log module (e.g., log module 224, FIG. 2) perform operation 526 or one or more portions of operation 526.

In some embodiments, the second un-map process allows (528) other commands from the host to be processed along with the un-map command. For example, in some embodiments, read and/or write commands from the host are processed along with the un-map command during the second un-map process. In some embodiments, the second un-map process allows other commands from the host to be processed along with the un-map command while maintaining strict ordering of commands from the host.

In some embodiments, the storage device saves (530) the mapping table, on a scheduled basis that is independent of un-map commands received from the host (e.g., independent of receiving and/or processing the un-map commands), to the non-volatile memory (e.g., NVM devices 140, 142, FIG. 1) of the storage device. For example, in some embodiments, the storage device saves the mapping table on a periodic basis. For example, segments of the mapping table are copied to non-volatile memory, in round robin order, at a rate of one segment per unit of time (e.g., one minute, five minutes, etc.) until the entire mapping table has been copied, and then resumes with the first segment of the mapping table. In some embodiments, the storage device saves the mapping table on a scheduled basis that is not periodic (e.g., at 1:00 am, at 3:30 am, and at 6:00 am). In some embodiments, a save module (e.g., save module 232, FIG. 2) is used to save the mapping table, on a scheduled basis that is independent of un-map commands received from the host, to the non-volatile memory of the storage device, as described above with respect to FIG. 2.

In some embodiments, saving the mapping table includes storing a plurality of distinct portions of the mapping table in the non-volatile memory at distinct scheduled times. In some embodiments, the storage device stores a portion (e.g., 10 MB) of the mapping table on a periodic basis (e.g., every hour, etc.). In some embodiments, the storage device stores a portion of the mapping table on a scheduled basis that is not periodic (e.g., at 1:00 am, at 3:30 am, and at 6:00 am). In some embodiments, the storage device saves a first portion of the mapping table at a first time, saves a second portion of the mapping table at a second time, saves a third portion of the mapping table at a third time, etc.

It will be understood that, although the terms "first," "second," etc. may be used herein to describe various elements, these elements should not be limited by these terms. These terms are only used to distinguish one element from another. For example, a first region could be termed a second region, and, similarly, a second region could be termed a first region, without changing the meaning of the description, so long as all occurrences of the "first region" are renamed consistently and all occurrences of the "second region" are renamed consistently. The first region and the second region are both regions, but they are not the same region.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the phrase "at least one of A, B and C" is to be construed to require one or more of the listed items, and this phase reads on a single instance of A alone, a single instance of B alone, or a single instance of C alone, while also encompassing combinations of the listed items such "one or more of A and one or more of B without any of C," and the like.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of managing a storage device, the method comprising:
maintaining a write cache, in volatile memory of the storage device, for storing data corresponding to write commands from a host, wherein the host is operatively coupled to the storage device, the storage device including non-volatile memory;
maintaining a mapping table in volatile memory, the mapping table used to translate logical addresses in a logical address space available to the host to physical addresses in a physical address space of the storage device;
receiving, at the storage device, an un-map command from the host;
determining whether a size of the un-map command satisfies a size threshold, wherein the size of the un-map command corresponds to a number of logical addresses to be un-mapped by the un-map command;
in accordance with a determination that the size of the un-map command satisfies the size threshold, performing one or more operations of a first un-map process, wherein the first un-map process does not include saving the mapping table to the non-volatile memory of the storage device; and
in accordance with a determination that the size of the un-map command does not satisfy the size threshold, performing one or more operations of a second un-map process, wherein the second un-map process does not include saving the mapping table to the non-volatile memory of the storage device and does not include flushing the write cache to the non-volatile memory of the storage device;
wherein the one or more operations of the first un-map process include updating the mapping table in volatile memory in accordance with the un-map command, and adding one or more entries to a log, the one or more entries corresponding to the un-map command; and
the one or more operations of the second un-map process include updating the mapping table in volatile memory in accordance with the un-map command, and adding one or more entries to a log, the one or more entries corresponding to the un-map command.

2. The method of claim 1, wherein the one or more operations of the first un-map process further include:
determining a number of entries in the write cache that contain dirty data and determining whether the number of entries in the write cache that contain dirty data satisfies a threshold;
in accordance with a determination that the number of entries in the write cache that contain dirty data satisfies the threshold, flushing the write cache to the non-volatile memory of the storage device;
in accordance with a determination that the number of entries in the write cache that contain dirty data does not satisfy the threshold, clearing each entry of the write cache that contains dirty data for a logical address unmapped by the un-map command.

3. The method of claim 1, wherein the one or more operations of the second un-map process further include:
determining whether data for a respective logical address specified by the un-map command is stored in the write cache;

in accordance with a determination that the data for the respective logical address is stored in the write cache:
  determining whether the data for the respective logical address is in flight;
  in accordance with a determination that the data for the respective logical address is in flight, waiting for a corresponding write operation to complete; and
  clearing from the write cache an entry storing the data for the respective logical address.

4. The method of claim 1, wherein the one or more operations of the second un-map process further include:
  determining whether data for a respective logical address specified by the un-map command is stored in the write cache;
  in accordance with a determination that the data for the respective logical address is stored in the write cache:
    determining whether the data for the respective logical address is in flight;
    in accordance with a determination that the data for the respective logical address is in flight, waiting for a corresponding write operation to complete; and
    clearing from the write cache an entry storing the data for the respective logical address.

5. The method of claim 1, wherein the second un-map process allows other commands from the host to be processed along with the un-map command.

6. The method of claim 1, wherein response time of the un-map command corresponds to the size of the un-map command.

7. The method of claim 1, further comprising saving the mapping table, on a scheduled basis that is independent of un-map commands received from the host, to the non-volatile memory of the storage device.

8. The method of claim 1, wherein the log includes an entry, for a respective un-map command, that includes information identifying a plurality of logical addresses un-mapped in accordance with the respective un-map command.

9. The method of claim 1, wherein the log includes an entry, for a respective un-map command, that includes information identifying a range of logical addresses un-mapped in accordance with the respective un-map command.

10. The method of claim 1, wherein the storage device comprises one or more flash memory devices.

11. A storage device, comprising:
  non-volatile memory;
  a write cache; and
  a storage controller having one or more processors configured to execute instructions in one or more programs;
  wherein the storage controller is configured to perform operations comprising:
    maintaining the write cache, in volatile memory of the storage device, for write commands from a host, wherein the host is operatively coupled to the storage device, and the write cache includes write commands from the host not yet saved to the non-volatile memory of the storage device;
    maintaining a mapping table in volatile memory, the mapping table used to translate logical addresses in a logical address space available to the host to physical addresses in a physical address space of the storage device;
    receiving, at the storage device, an un-map command from the host;
    determining whether a size of the un-map command satisfies a size threshold, wherein the size of the un-map command corresponds to a number of logical addresses to be un-mapped by the un-map command;
    in accordance with a determination that the size of the un-map command satisfies the size threshold, performing one or more operations of a first un-map process, wherein the first un-map process does not include saving the mapping table to the non-volatile memory of the storage device; and
    in accordance with a determination that the size of the un-map command does not satisfy the size threshold, performing one or more operations of a second un-map process, wherein the second un-map process does not include saving the mapping table to the non-volatile memory of the storage device and does not include flushing the write cache to the non-volatile memory of the storage device;
  wherein the one or more operations of the first un-map process include updating the mapping table in volatile memory in accordance with the un-map command, and adding one or more entries to a log, the one or more entries corresponding to the un-map command; and the one or more operations of the second un-map process include updating the mapping table in volatile memory in accordance with the un-map command, and adding one or more entries to a log, the one or more entries corresponding to the un-map command.

12. The storage device of claim 11, wherein the storage controller includes:
  a write cache module for maintaining the write cache;
  a mapping module for maintaining the mapping table; and
  an un-map module that determines whether the size of the un-map command satisfies the size threshold, performs the first un-map process in accordance with the determination that the size of the un-map command satisfies the size threshold, and performs the second un-map process in accordance with the determination that the size of the un-map command does not satisfy the size threshold.

13. The storage device of claim 11, wherein the one or more operations of the first un-map process further include:
  determining a number of entries in the write cache that contain dirty data and determining whether the number of entries in the write cache that contain dirty data satisfies a threshold;
  in accordance with a determination that the number of entries in the write cache that contain dirty data satisfies the threshold, flushing the write cache to the non-volatile memory of the storage device;
  in accordance with a determination that the number of entries in the write cache that contain dirty data does not satisfy the threshold, clearing each entry of the write cache that contains data for a logical address unmapped by the un-map command.

14. The storage device of claim 11, wherein the one or more operations of the second un-map process include:
  for each logical address specified by the un-map command, in accordance with a determination that data for the logical address is stored in the write cache, clearing from the write cache an entry storing the data for the logical address.

15. The storage device of claim 11, wherein the one or more operations of the second un-map process further include:

determining whether data for a respective logical address specified by the un-map command is stored in the write cache;

in accordance with a determination that the data for the respective logical address is stored in the write cache:
    determining whether the data for the respective logical address is in flight;
    in accordance with a determination that the data for the respective logical address is in flight, waiting for a corresponding write operation to complete; and
    clearing from the write cache an entry storing the data for the respective logical address.

16. The storage device of claim 11, wherein the second un-map process allows other commands from the host to be processed along with the un-map command.

17. The storage device of claim 11, wherein response time of the un-map command corresponds to the size of the un-map command.

18. The storage device of claim 11, further comprising saving the mapping table, on a scheduled basis that is independent of un-map commands received from the host, to the non-volatile memory of the storage device.

19. The storage device of claim 11, wherein the storage device comprises one or more flash memory devices.

20. A non-transitory computer readable storage medium, storing one or more programs configured for execution by one or more processors of a storage controller in a storage device, the storage device having non-volatile memory and a write cache, wherein execution of the one or more programs by the one or more processors causes the storage device to perform operations comprising:

maintaining the write cache, in volatile memory of the storage device, for write commands from a host, wherein the host is operatively coupled to the storage device, the storage device including non-volatile memory, wherein the write cache includes write commands from the host not yet saved to the non-volatile memory of the storage device;

maintaining a mapping table in volatile memory, the mapping table used to translate logical addresses in a logical address space available to the host to physical addresses in a physical address space of the storage device;

receiving, at the storage device, an un-map command from the host;

determining whether a size of the un-map command satisfies a size threshold, wherein the size of the un-map command corresponds to a number of logical addresses to be un-mapped by the un-map command;

in accordance with a determination that the size of the un-map command satisfies the size threshold, performing one or more operations of a first un-map process, wherein the first un-map process does not include saving the mapping table to the non-volatile memory of the storage device; and in accordance with a determination that the size of the un-map command does not satisfy the size threshold, performing one or more operations of a second un-map process, wherein the second un-map process does not include saving the mapping table to the non-volatile memory of the storage device and does not include flushing the write cache to the non-volatile memory of the storage device;

wherein the one or more operations of the first un-map process include updating the mapping table in volatile memory in accordance with the un-map command, and adding one or more entries to a log, the one or more entries corresponding to the un-map command; and the one or more operations of the second un-map process include updating the mapping table in volatile memory in accordance with the un-map command, and adding one or more entries to a log, the one or more entries corresponding to the un-map command.

* * * * *

UNITED STATES PATENT AND TRADEMARK OFFICE
CERTIFICATE OF CORRECTION

PATENT NO.         : 9,558,125 B2                                    Page 1 of 1
APPLICATION NO.    : 14/668690
DATED              : January 31, 2017
INVENTOR(S)        : Thangaraj et al.

It is certified that error appears in the above-identified patent and that said Letters Patent is hereby corrected as shown below:

In the Claims

Claim 3, Column 24, Line 63 please delete "claim 3 in its entirety", insert:

--3. The method of claim 1, wherein the one or more operations of the second un-map process include:
   for each logical address specified by the un-map command, in accordance with a determination that data for the logical address is stored in the write cache, clearing from the write cache an entry storing the data for the logical address.--.

Signed and Sealed this
Fourth Day of April, 2017

Michelle K. Lee
*Director of the United States Patent and Trademark Office*